April 11, 1944.  G. J. SCHMIDT  2,346,189
PIN SETTING APPARATUS FOR BOWLING ALLEYS
Filed June 26, 1941  12 Sheets-Sheet 1

INVENTOR
GOTTFRIED J. SCHMIDT
BY *Georges Hastings*
ATTORNEY

April 11, 1944.   G. J. SCHMIDT   2,346,189
PIN SETTING APPARATUS FOR BOWLING ALLEYS
Filed June 26, 1941   12 Sheets-Sheet 2
Fig. 1ª.
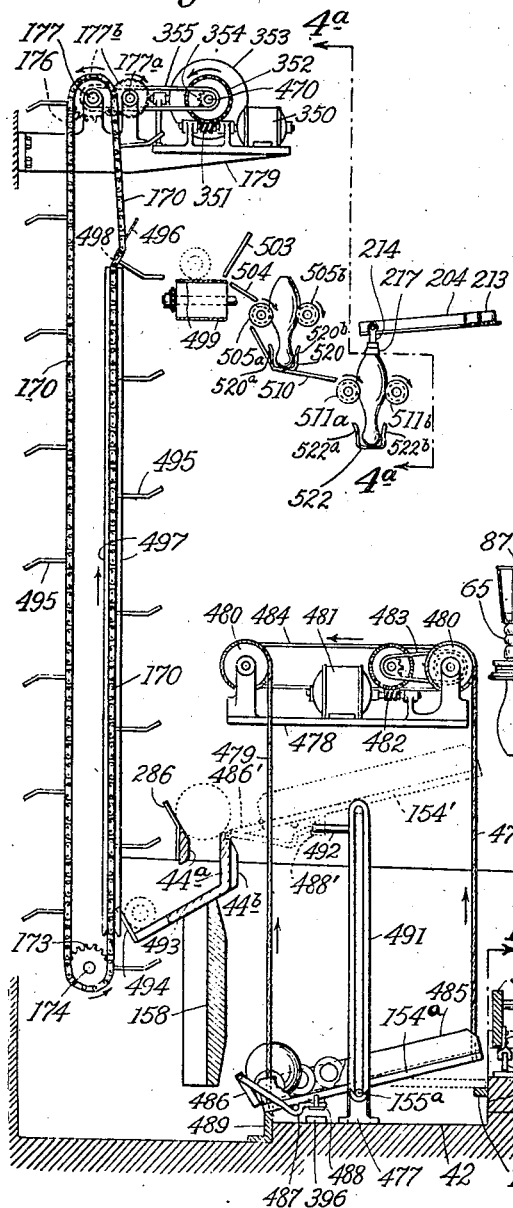
Fig. 4ª.
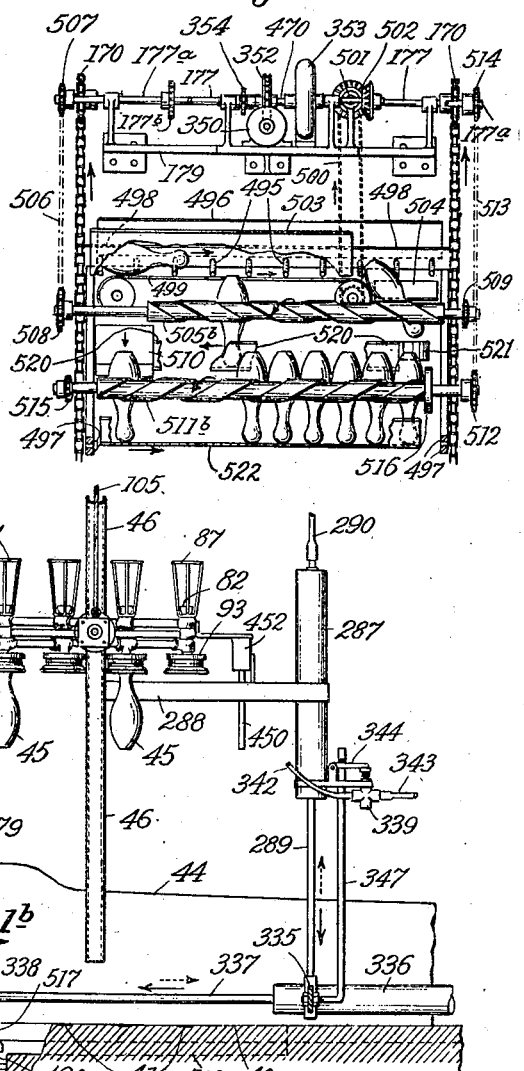
Fig. 1ᵇ.
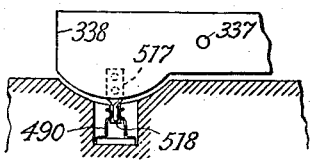
Fig. 1ᶜ.
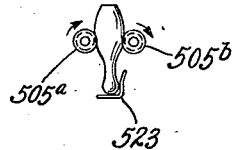
INVENTOR
GOTTFRIED J. SCHMIDT
BY *Georges Hastings*
ATTORNEY April 11, 1944.    G. J. SCHMIDT    2,346,189
PIN SETTING APPARATUS FOR BOWLING ALLEYS
Filed June 26, 1941    12 Sheets-Sheet 3

INVENTOR
GOTTFRIED J. SCHMIDT
BY
ATTORNEY

April 11, 1944.  G. J. SCHMIDT  2,346,189
PIN SETTING APPARATUS FOR BOWLING ALLEYS
Filed June 26, 1941  12 Sheets-Sheet 4

INVENTOR
GOTTFRIED J. SCHMIDT
BY
ATTORNEY

April 11, 1944. G. J. SCHMIDT 2,346,189
PIN SETTING APPARATUS FOR BOWLING ALLEYS
Filed June 26, 1941 12 Sheets-Sheet 5
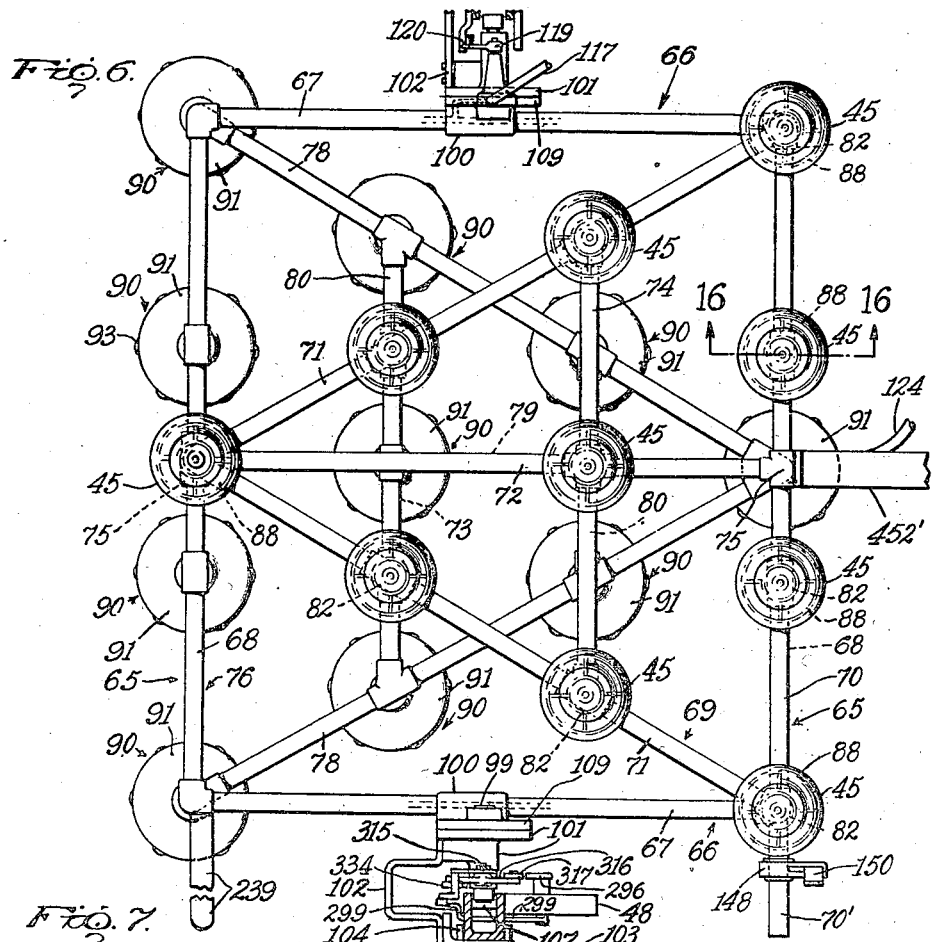
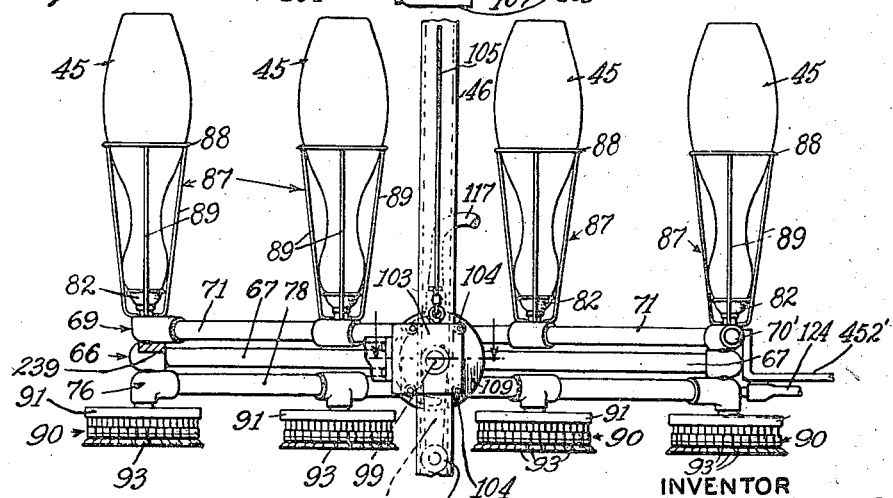
INVENTOR
GOTTFRIED J. SCHMIDT
BY George Hastings
ATTORNEY April 11, 1944.  G. J. SCHMIDT  2,346,189
PIN SETTING APPARATUS FOR BOWLING ALLEYS
Filed June 26, 1941  12 Sheets-Sheet 6
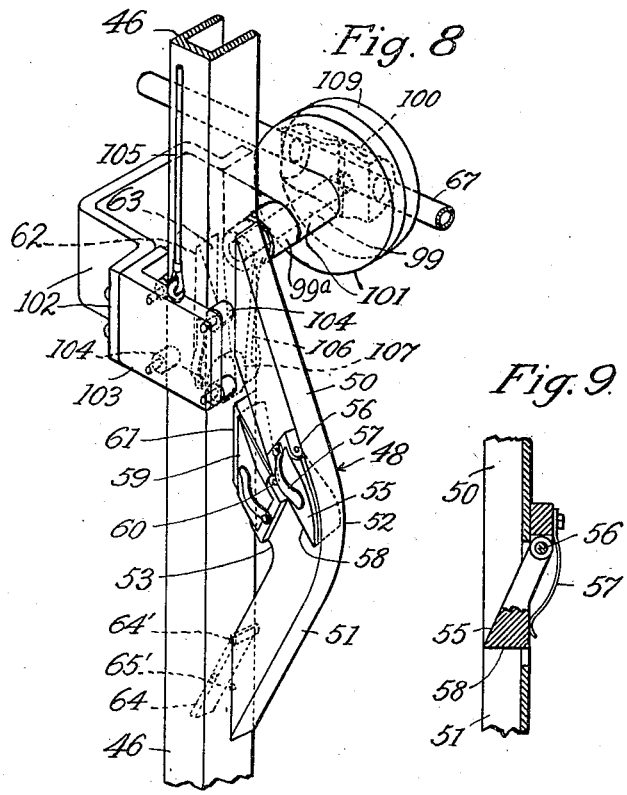
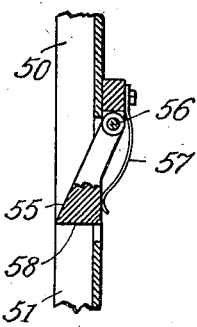
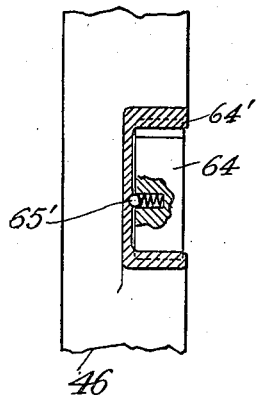
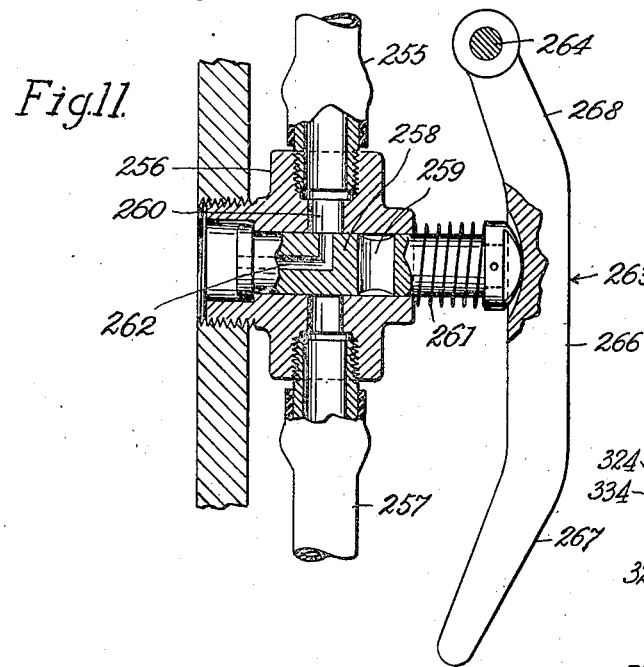
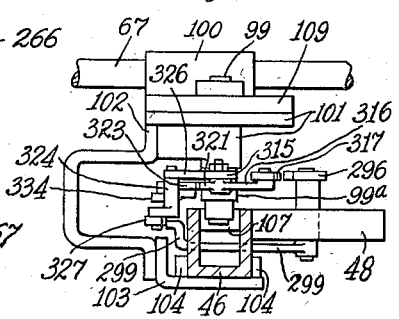
INVENTOR
GOTTFRIED J. SCHMIDT
BY *George Krolory*
ATTORNEY April 11, 1944.　　　G. J. SCHMIDT　　　2,346,189

PIN SETTING APPARATUS FOR BOWLING ALLEYS

Filed June 26, 1941　　　12 Sheets-Sheet 7

INVENTOR
GOTTFRIED J. SCHMIDT
BY
ATTORNEY

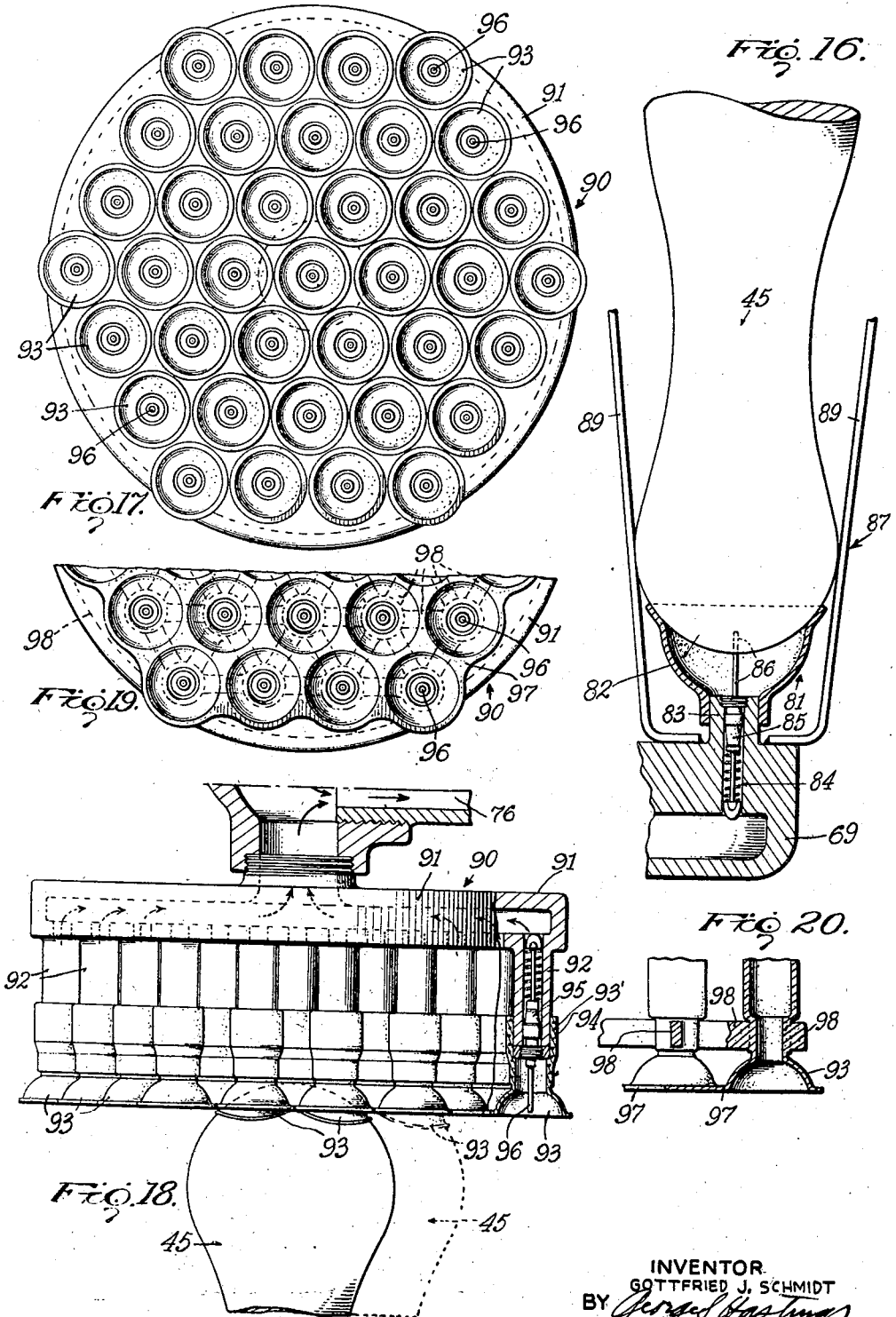

April 11, 1944. G. J. SCHMIDT 2,346,189
PIN SETTING APPARATUS FOR BOWLING ALLEYS
Filed June 26, 1941 12 Sheets-Sheet 9

INVENTOR
GOTTFRIED J. SCHMIDT
BY
ATTORNEY

April 11, 1944.  G. J. SCHMIDT  2,346,189
PIN SETTING APPARATUS FOR BOWLING ALLEYS
Filed June 26, 1941   12 Sheets-Sheet 10
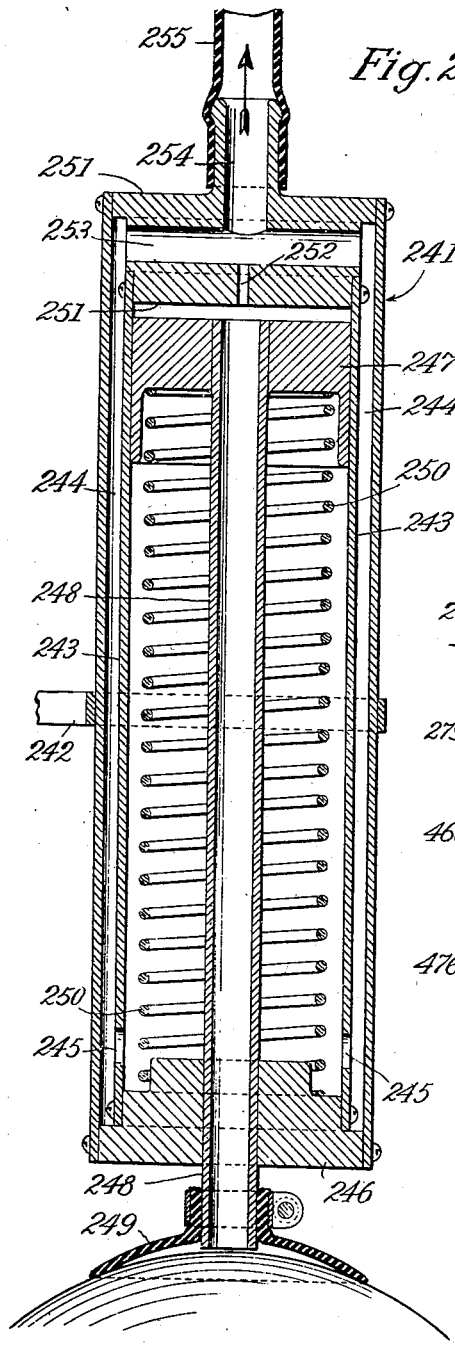
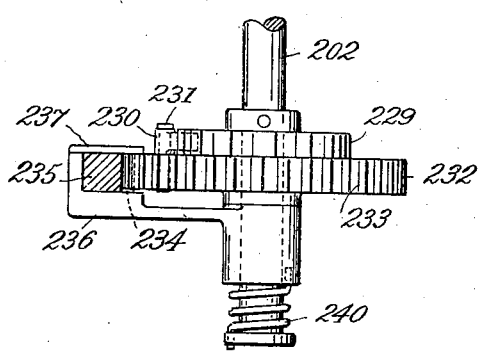
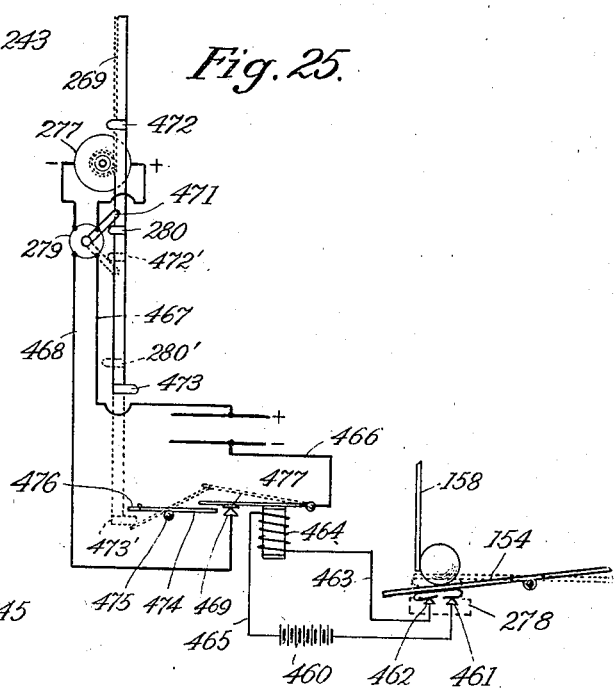
INVENTOR
GOTTFRIED J. SCHMIDT
BY
ATTORNEY April 11, 1944.　　　G. J. SCHMIDT　　　2,346,189
PIN SETTING APPARATUS FOR BOWLING ALLEYS
Filed June 26, 1941　　　12 Sheets-Sheet 11

INVENTOR
GOTTFRIED J. SCHMIDT
BY Georges Hostings
ATTORNEY

April 11, 1944.  G. J. SCHMIDT  2,346,189
PIN SETTING APPARATUS FOR BOWLING ALLEYS
Filed June 26, 1941  12 Sheets-Sheet 12

INVENTOR
GOTTFRIED J. SCHMIDT
BY
ATTORNEY

Patented Apr. 11, 1944

2,346,189

UNITED STATES PATENT OFFICE 2,346,189

PIN SETTING APPARATUS FOR BOWLING ALLEYS

Gottfried J. Schmidt, Pearl River, N. Y., assignor to Bowling Patents Management Corporation, a corporation of New York Application June 26, 1941, Serial No. 399,815

106 Claims. (Cl. 273—43)

My invention relates to pin setting apparatus for bowling alleys, and is a continuation in part of my application for Pin setting apparatus for bowling alleys, Serial No. 204,995, filed April 29, 1938.

An important object of the present invention is that of providing pin elevating and conveying means for the pit which will be compact and fit into the strictly limited and inflexible space requirements of the average alley pit now in use. Thus there is often insufficient space behind the bumper board in which to elevate the ball and it is an object of one form of the invention to permit lifting and conveying of the balls in particular and preferably the pins also in front of the bumper while using the limited space behind the bumper to receive part of the means for elevating the narrower pins. The foregoing is especially desirable when the pin spotter is to be applied to an old alley in which the pit abuts a wall and in which the distance in back of the bumper may be less than one foot. Under such circumstances, since space over the pit in front of the bumper is much needed for the pit elevator and its operating means and for the pit magazine and pit transfers and because it is important in many installations to limit the height to average room height, i. e., eight feet, it is an object of the invention to use the limited space behind the bumper for the pin handling and conveying means and to use the space over the bumper for the ball and pin separating and for initiating the return of the ball.

A principal object of the invention is to provide reliable, rapid and compact means for gathering up the fallen pins and ball, separate the ball from the pins, return the ball, and place the pins in a magazine which shall at all times hold a sufficiency of pins for playing purposes (generally ten) ready for transfer to the pin setter so that there will be no possibility of less than the usual number being set for play.

Another object is to provide that the supply for playing be in uniform position and arrangement in the magazine after successive cycles of operation in order that the transferring of such pins to the setter may be made reliable.

Still another object is to provide for arranging the pins in uniform vertical and inverted position and for transferring the pins in inverted position, preferably suspended from one end to a spotter adapted to receive the suspended pins. Because pins have their greatest transverse dimension at the belly portion which when the pin is inverted is well above the center of gravity, by means spaced a little less than the diameter of the pins, it is possible to handle the pins in uniform position, by relatively simple and reliable mechanism and it is an object of the invention to provide pin handling mechanism operating in this manner.

Another object is to provide improved transfer means for removing pins from their row formation in the magazine and arrange them in triangular playing formation for delivery to pin holders in similar formation to the pin setter which deposits the pins on the alley bed.

A further object is to deliver pins from the pit of a bowling alley to a magazine where they form a vertical aligned series and utilize means for transferring pins out of alignment and placing them in predetermined playing position on the alley bed.

As is well known, the proper setting of pins upon the bed of a bowling alley necessitates the accurate spotting of the pins so that they are concentric with the spots. This accurate setting of the pins causes the pins to assume the proper positions, when starting the game. It frequently happens that after one or more balls are thrown, and some of the pins knocked down, that the remaining standing pins have been struck sufficiently so that they are shifted laterally and are not concentric with the spots. In order that the bed may be swept to remove the pins which have been knocked down, it is necessary to remove the standing pins to permit of the sweeping and subsequent returning of the standing pins to the precise positions which they previously occupied, regardless of whether they have been somewhat displaced.

Attempts have heretofore been made to produce a pin setting apparatus, but these have not proven to be wholly satisfactory. One reason why they have not proven wholly satisfactory is that as a rule they cannot properly engage the pins standing to raise them, if such pins are eccentric with respect to the spots on the bowling alley bed and return the pins to the precise positions which they occupied before being raised. A further disadvantage is that these pin setters have mechanical or magnetic means to engage with the pins of a type which has resulted in very complicated structures, which commonly required modification of the pins or were very sensitive to bruised or battered condition of the pins.

An important object of my invention is to provide the apparatus of the above mentioned character having pin setting means which will properly engage with the standing pins, regardless of whether they are occupying positions concentric with the spots or have been shifted laterally so that they are off center with respect to the spots and raise the pins from the bed, to permit of the sweeping of the bed, and return the pins to the precise positions previously occupied on the bed.

A further object of the invention is to provide suction means, to properly handle the pins, whether concentric or eccentric with respect to the spots on the bed.

A further object of the invention is to provide means to accurately set the pins upon the bed of the alley, raise the remaining standing pins after the ball has been thrown, and then accurately reset such raised pins in the true positions which they previously occupied upon the bed.

A further object of the invention is to provide the apparatus of the above mentioned character which is automatic in operation, and set into action by the throwing of the first ball, to raise the remaining standing pins, sweep the bed, and then reset or spot the elevated pins upon the bed, provided a strike has not been made.

A further object of the invention is to provide the apparatus of the above mentioned character which is automatically set into action when the second ball is thrown, to sweep the bed, and set the required number of pins upon the bed, and properly spot the same.

A further object of the invention is to provide means to set the apparatus into operation, when a strike is made, which will cause the apparatus to function to sweep the bed and set the required number of pins upon the bed, without stopping for the throwing of the second ball.

A further object of the invention is to provide means for controlling the operation of the sweeping mechanism, so that it will function at proper intervals in sequence with the setting or resetting means.

A further object of the invention is to provide an elevator having pin setting and pin spotting means, and reversible to properly present the same for action, thus affording a simplified construction.

A further object of the invention is to provide means for feeding bowling pins for assembly in an aligned series and provide mechanism coacting therewith to engage with head ends of pins for assisting in the feeding and assembly of such pins.

Other objects and advantages of the invention will be apparent during the course of the following description.

While I have disclosed one type of suction resetting device, which has a range of action sufficient to pick up off-center pins and replace them in same off-center position, it is obvious that other devices could be used with equal success for the same purpose, such for instance as that disclosed in my co-pending application, Serial No. 173,926, now Patent No. 2,217,709, granted October 15, 1940. In this type, a single suction pin gripping element is provided for each pin. A conical guide element carries this device at its apex. In this type the conical guide element is mounted between upper and lower plates for limited lateral shifting movement as a result of the centralizing effect by the pin on the downwardly flaring cone as it engages an off center pin on the downward or resetting movement. Reference is made to said patent, for further details of this type of suction resetter.

In the accompanying drawings forming a part of this application and in which like numerals are employed to designate the same or like elements:

Figure 1a is a side elevation showing a modification of the ball and pin return;

Figure 1b is an end elevation on line 1b—1b of Figure 1a;

Figure 1c is an end view of a detail of the pin transfer spirals showing a modified form of pin head positioning plate;

Figure 4a is an end elevation on line 4a—4a of Figure 1a;

Figure 6 is an enlarged plan view of the pin elevator;

Figure 7 is an enlarged elevation of the same;

Figure 8 is a perspective view of the elevator inverting means or track;

Figure 9 is a cross-section of one of the gates in the elevator track;

Figure 10 is a cross-section of another elevator track gate, parts broken away;

Figure 11 is an enlarged cross-section of one of the valve devices shown in Figure 1;

Figure 16 is an enlarged sectional view taken on line 16—16 of Figure 6;

Figure 17 is a bottom plan view of the resetting suction element or unit;

Figure 18 is an elevation of the same, parts in section;

Figure 19 is a plan view of a modified form of the resetting suction device or unit;

Figure 20 is a side elevation of the same, parts in section;

Figure 23 is a central longitudinal section through the suction operated ball pick up means;

Figure 24 is a detailed top view of the transfer rail tilting means, on line 24—24 of Figure 21;

Figure 25 is a diagram of the electrical connections for automatically operating the ball lifting mechanism;

Figure 30 is an enlarged detail plan view corresponding to Fig. 6, showing the means for controlling the sweeping mechanism.

Figure 1:
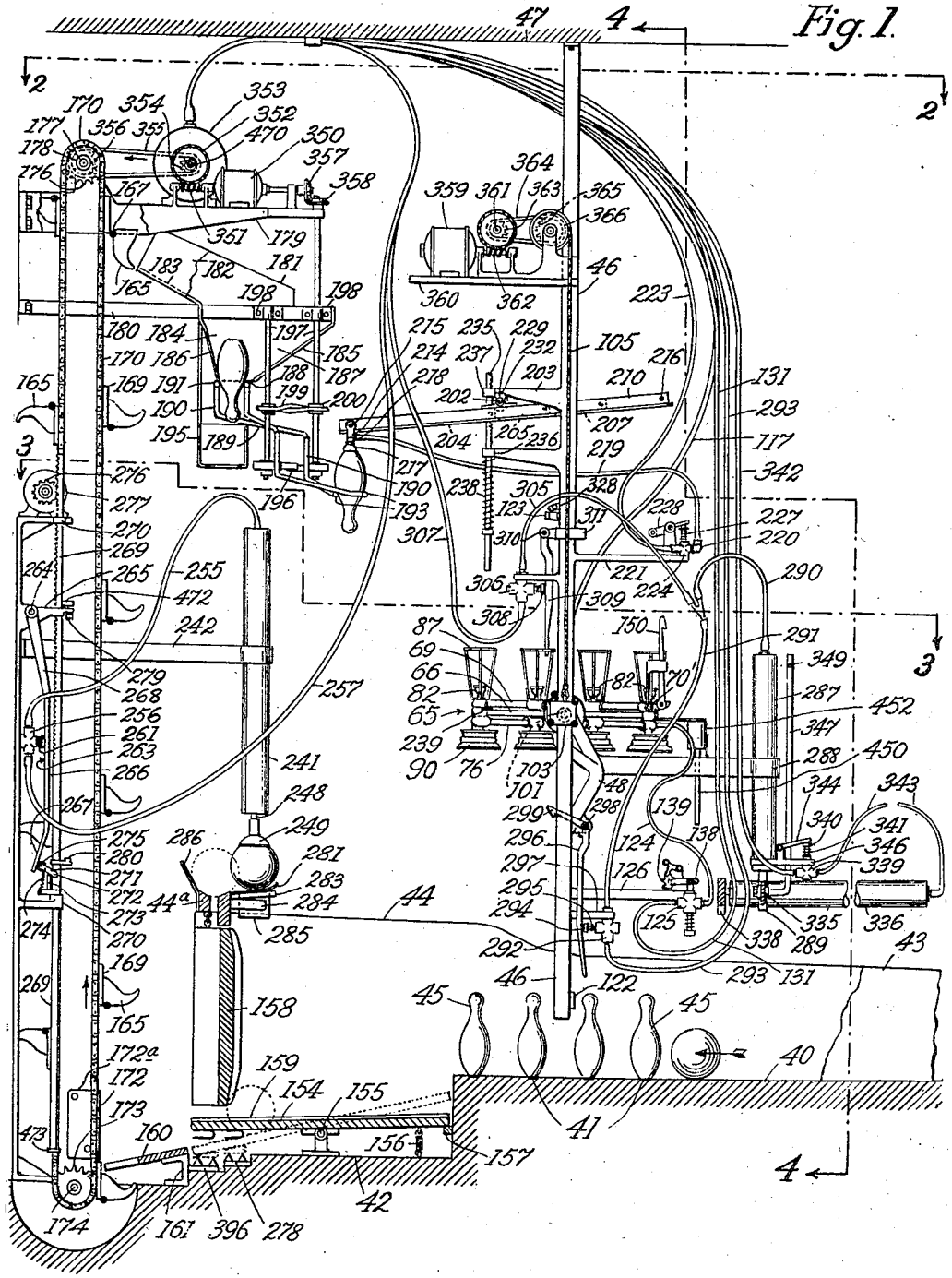
Figure 1 is a side elevation of the apparatus embodying my invention.

In the drawings, wherein for the purpose of illustration is shown a preferred embodiment of my invention, the numeral 40 designates the bed of an alley (Figures 1 to 4 inclusive), having the usual spots 41. At the forward end of the bed 40 is a pit 42. The numeral 43 designates partitions, one of which is provided with the usual ball return track or runway 44. The numeral 45 designates the bowling pins.

The apparatus for each alley comprises a pair of spaced vertical grooved tracks or guides 46, which are preferably U-shaped in cross-section. The upper ends of the vertical tracks are rigidly attached to a stationary horizontal structure 47 and their lower ends are rigidly attached to the partitions 43.

Each grooved track 46 is provided with a laterally extending portion 48 (Figure 8) including an upper branch 50 and a lower branch 51, connected by an intermediate curved portion 52. The upper and lower branches 50 and 51 are inclined vertically and diverge toward the vertical track 46. Each vertical grooved track 46 is also provided with a third laterally extending grooved branch 53, which leads into the grooved track 46 inwardly of and near the upper end of the branch 50 and also leads into the portion 48 adjacent to the curved intermediate portion 52. The upper branch 50 also leads into the outer end of the branch 53, adjacent to the curved portion 52, and the pivoted gate 55 is arranged to control the passage of the roller from the branch 51 into the branch 53. The gate 55 is pivoted at 56 adjacent to its upper end. The gate 55 is forced inwardly by a spring 57. This gate has a stop shoulder 58 at its lower end (Figure 9). It is thus seen that a roller traveling downwardly through the branch 50 will depress the gate 55 and pass the same to enter the lower branch 51, but when this roller travels upwardly through the branch 51, it will engage the stop shoulder 58 and be deflected thereby into the branch 53. A gate 59 is pivoted at 60 and has a stop shoulder 61 and is arranged adjacent to the union of the branch 53 and the track 46. This gate is spring-pressed and is similar to the gate 55 and will serve to permit the roller traveling upwardly through the branch 53 to enter the vertical track 46, but will prevent the roller entering the upper end of the branch 53 when it moves downwardly in the track 46. Another pivoted gate 62 is arranged adjacent to the union of the upper end of the branch 50 with the track 46 and has a stop shoulder 63. This gate is spring-pressed and similar to the gate 55. This gate 62 will deflect the roller from the grooved track 46 into the upper end of the branch 50 upon the downward travel of the roller. When the roller moves upwardly in the track 46 beneath the gate 62, it will depress this gate and move past it to the upper portion of the track 46. Arranged at the junction of the lower end of the branch 51 and the track 46 is a two-way gate 64, pivoted at 64' and having a spring catch 65' (Figure 10), to releasably hold the gate in the pivoted position.

The apparatus further embodies an elevator, carriage or carrier designated as a whole by the numeral 65, see more particularly Figures 6 and 7. This elevator or carriage comprises an intermediate rectangular tubular frame 66, consisting of sides 67 and ends 68. The numeral 69 designates a tubular triangular setting frame, including a base 70 and sides 71, which converge, as shown. A pipe 72 is connected with the middle of the base pipe 70 and the forward ends of the converging transverse pipes which connect the pipe 72 with the converging pipes 71. It will be understood that all portions of the bores of the tubular triangular frame 69 are in communication with each other. The triangular tubular frame 69 is placed upon one side of the intermediate frame 66, upon the upper side thereof in Figure 7 and rigidly connected therewith, and the bore of the tubular frame 66 is in communication with the bore of the tubular frame 69 through the medium of pipe couplings 75 at the center of sides 68. Arranged upon the opposite side of the intermediate frame 69 or beneath the same in Figure 7, is a triangular resetting frame 76, which comprises a base pipe 77, and converging side pipes 78. A pipe 79 is connected from the middle of the base pipe 77 to the joint of the side pipes 78, and intermediate transverse pipes 80 are connected with the pipes 78 and 79. The resetting frame 76 is rigidly connected with the intermediate frame 66 but its bore has no communication therewith. Attention is called to the fact that the base of the setting frame 69 is arranged adjacent to the apex of the setting frame 76 and vice versa.

The setting frame 69 carries suction devices 81 (see particularly Figure 16) for engaging with the head ends of the bowling pins. These suction devices are arranged to correspond with the arrangement of the bowling pins, when placed in the spotted position upon the bed of the bowling alley, except that the base of the group of suction devices before the carriage or elevator is inverted is positioned next to the player, so that the converging end of the group of suction devices will be arranged next to the player when the elevator or carriage is inverted, in a manner to be described. Each suction device comprises a flexible suction cup 82, secured to a tubular nipple 83, in communication with the bore of the tubular setting frame 69. The suction cups 82 are preferably formed of rubber and are of a suitable size to fit over the end portion of the head end of the bowling pin 45. The nipple 83 has a passage 84 adapted to establish communication between the bore of the frame 69 and the interior of the suction cup, such communication being controlled by a spring actuated self-closing valve 85, having a stem 86 projected into the suction cup 82, and adapted to be engaged and moved by the head of the bowling pin, to unseat the valve element of the valve 85. It might be stated at this point that before the head end of the bowling pin 45 passes into the suction cup, that the valve 85 is closed whereby the suction within the bore of the setting frame 69 is not transmitted to the suction cup, but as soon as the head end of the bowling pin enters the suction cup 82, sufficiently so that the suction cup may have proper holding engagement therewith, the stem 86 is moved inwardly to contact with the head end of the bowling pin and the valve 85 is opened, whereby suction is now transmitted to the interior of the suction cup 82, which will have proper holding action with the head end of the bowling pin 25. Each suction device is preferably provided with a wire guard or stabilizing device 87, which is rigidly attached to the setting frame 69 adjacent to the suction device. This guard is tapered and increases in diameter outwardly and is preferably adapted to suitably engage with the intermediate or body portion of the bowling pin, to hold the same against any perceptible tilting action with respect to the suction cup, when the carrier is inverted. The guard includes a ring 88 and resilient rods 89. The ring 88 is of a greater diameter than the head end of the pin but of a smaller diameter than the largest diameter of the pin, and the ring will engage the pin inserted therein in an inverted position, at a point above its center of gravity, whereby the pin will automatically assume a vertical position while its head end engages the suction cup.

The resetting frame 76 carries suction devices or units 90 (Figure 17) also adapted to engage with the head ends of the pins. These resetting suction devices are arranged in a manner corresponding to the arrangement of the pins 45, when spotted for playing. Each suction device 90 comprises a cylindrical shell 91 (Figure 18) rigidly attached to the frame 76 and having its bore in communication therewith. The shell 91 is preferably cylindrical and is provided with nipples 92 arranged in rows (as shown) whereby they are preferably arranged in triangular groups of three throughout the entire area of the device. A suction cup 93 formed of rubber or the like has a shank 93' which is mounted upon the free end of each tubular nipple 92 and preferably has a coil spring 94 embedded therein, to impart to the shank a suitable stiffness against lateral movement. This spring 94 may also be arranged upon the interior of the shank 93', if desired. A valve device 95 is mounted in each tubular nipple 92 and includes a spring pressed valve body, adapted to be opened by a stem 96, connected with the valve body and arranged within the suction cup 93. It might be stated at this point that, before the suction cup is brought into engagement with, or in proximity to, the head end of the pin, the valve body of the valve device 95 is closed therefore cutting off communication between the interior of the shell 91 and the interior of the suction cup 93. However, when the head end of the pin is moved into the suction cup 93, it engages and moves the stem 96 unseating the valve body, whereby the suction is transmitted from the shell 91 to the suction cup 93. As before stated, tubular nipples 92 are so arranged that they are disposed in triangular groups of threes over the entire area of the shell 91. The suction cups 93 extend through substantially the entire area of the shell 91, and the shell 91 has a diameter considerably larger than the diameter of the head end of the pin. This is an important feature of the invention. If the pin is off center with respect to the spot on the bed, of the bowling alley, when the shell 91 descends in resetting or spotting the pins, in a manner to be described, the shell 91 is concentric with respect to the corresponding spot, while the pin is eccentric with respect to the spot. However, since the effective suction area of the resetting or spotting suction device is considerably larger than the head end of the pin, it will properly engage with the head end of the pin, if the pin is eccentric with respect to the spot. As the resetting or spotting suction device engages the head end of the pin, three suction cups 93 will at all times engage therewith, and their valves will be unseated so that the three suction cups will have holding engagement with the head end of the pin. This is true if the pin is concentric with its spot or eccentric with relation thereto for only a slight distance, or for a considerable distance. In Figures 17 and 18, the suction cups 93 are shown as preferably separate and arranged in close relation, while the invention is not restricted to this arrangement. In Figures 19 and 20, the suction cups 93 are shown as connected at their lips with a web or sheet 97 and also at their stems by webs 98. By having three suction cups always engaging the head end of the pin, the pin will be suspended in a truly vertical position, when being moved from and toward the bed of the bowling alley, thus rendering it possible to return the pins to the precise position on the bed that they occupied before being lifted therefrom, regardless of whether the pin 45 was concentric or eccentric with respect to the spot on the bed. The invention is not restricted to the employment of three cups 93 in a group, as any other suitable number of cups may be used, when properly arranged in the group.

The elevator or carriage 65 is arranged between the two tracks 46 (as shown in Figures 1, 2, 3 and 4). The elevator is mounted upon horizontal trunnion 99 (see Figures 8 and 12 to 14). The trunnions 99 are rigidly connected with the sides 67 of the rectangular frame 66 by couplings 100 and are journalled in bearings 101, which are rigidly bolted to plates 102, in turn rigidly secured to vertically movable carriages 103. These carriages travel upon the outer sides of the tracks 46 and have guide rollers 104. The carriage is raised by cables 105, and lowered by gravity when the cables are paid out.

Rigidly connected with the outer ends of the trunnions 99 are cranks 106, carrying rollers 107 at their free ends and these rollers are adapted to travel within the grooved tracks 46 and their several branches, in a manner to be described.

Figure 12:
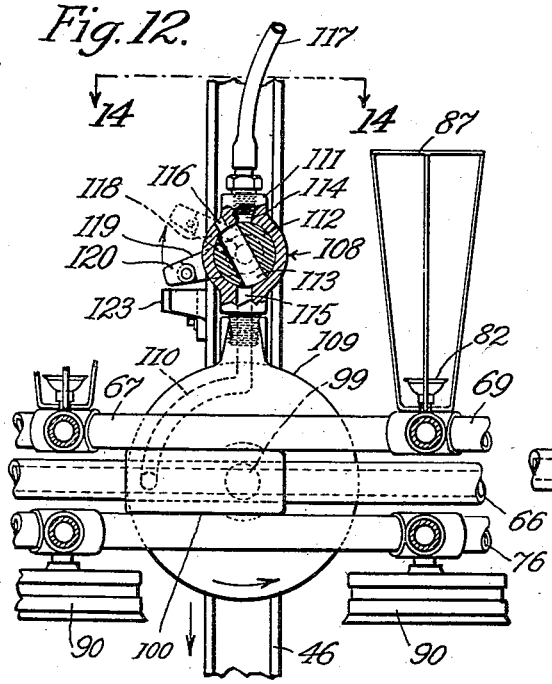
Figure 12 is a side elevation for the supporting device for one side of the elevator, with an associate valve.
Figure 14:
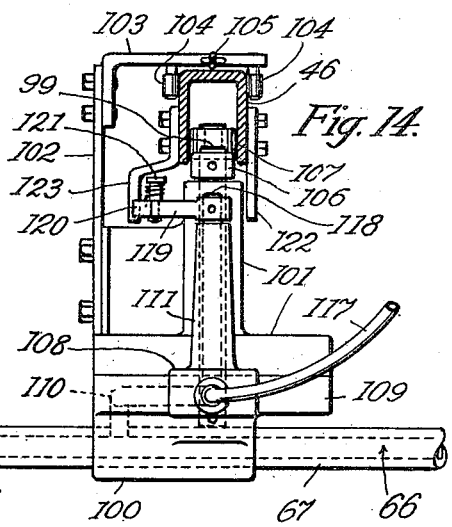
Figure 14 is a plan view partly in cross-section, taken on line 14—14 of Figure 12.
Figure 13:
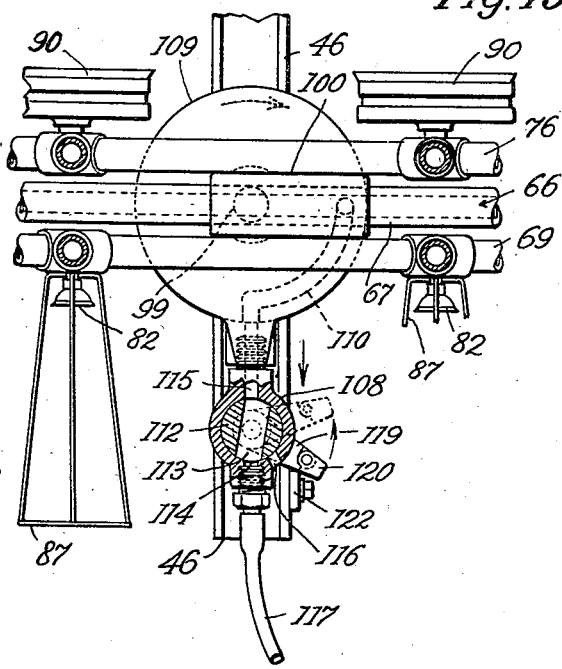
Figure 13 is a similar view, showing the elevator inverted.
Figure 15:
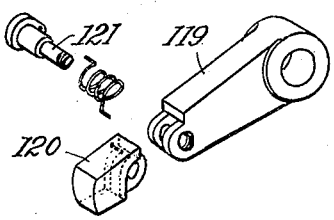
Figure 15 is an exploded perspective view of the valve element shifting arm.

Means are provided to supply suction to the bore of the setting frame 69 comprising a valve structure 108 (Figures 12, 13 and 14) rigidly mounted upon a disk 109 having a port 110 leading into pipe 67 of the intermediate rectangular frame 66. The valve structure comprises a casing 111, having a pivoted valve body 112 therein, and this valve body has a transverse port 113 to register with ports 114 and 115, which are opposite and with an exhaust port 116. The port 114 is in communication with the flexible suction hose 117. The valve body 112 is rigidly mounted upon a rock shaft 118 having a crank 119 rigidly secured thereto. This crank is provided with a trip extension 120, having a spring-pressed knee joint 121 (Figure 15). Disposed suitably near and spaced from the bed 40 is a stationary stop or trip 122 (Figure 13) rigidly secured to the track 46. This stop is located laterally inward with respect to the crank 119 so that it will engage with this crank 119 and not with the trip extension 120. It is thus seen that when the carriage or elevator is inverted and moves downwardly to place the bowling pins 45 upon the bed 40, that crank 119 will be swung upwardly by the stop 122 and the valve body 112 turned so that communication will be broken between ports 114 and 115 and port 114 placed in communication with port 116, as shown in Figure 12. Arranged near the end of the upward travel of the elevator or carriage is a stationary stop 123 (Figure 12) also rigidly attached to the track 46. This stationary stop 123 is out of the path of travel of the crank 119, but in the path of travel of the trip extension 120 (as shown in Figure 14). The suction has been cut off from the setting frame 66, when it reached its lowermost position, and when the elevator or carriage rises and reaches the uppermost position, to receive a further set of pins, the trip extension 120 breaks downwardly and assumes a position above the trip 123. When the carriage or elevator again moves downwardly to reset the pins, trip extension 120 will engage stop 123 and swing crank 119 upwardly, which will turn the valve body 112 so that port 115 will communicate with port 114 through the medium of port 113 (as shown in Figure 13).

Means are provided to supply and control the suction to the resetting or spotting frame 76, including a flexible hose 124 which is connected with a valve structure 125. The hose 124 is connected with the resetting frame 76 and has communication with the bore of the same. Attention is called to Figures 5 and 22, for the description and operation of this valve structure 125. The valve structure 125 is stationary and is supported at a suitable elevation from the bed 40 by an arm or bracket 126 (Figure 1). This valve structure includes a casing 127, having a main bore 128 and oppositely arranged suction ports 129 and 130. The port 129 is in communication with the flexible hose 124, while the port 130 is in communication with a hose 131. Mounted to slide within the bore 128 is a reciprocatory valve body 132, having a shoulder 133 to limit its downward or inward movement. The downward movement of the valve body 132 is effected by a spring 134. The valve body 132 has a transverse suction port 135, adapted to register with ports 129 and 130. This valve body also has a longitudinal exhaust port 136, having a lateral extension 137, adapted to communicate with the port 129. The valve body 132 is raised by a crank 138 having a pin and slot connection therewith, and this crank is formed integral with a segmental ratchet 139 (Figure 22) mounted to turn upon a pivot 140 carried by a bracket 141 rigidly mounted upon the arm 126. Pivoted upon the bracket 141 at 142 is a gravity operated dog 143 carrying the roller 144. This dog is adapted to engage with the teeth of the segmental ratchet 139 and to also drop behind the shoulder 145 of the same. An arm or support 146 rigidly mounted upon the setting frame 69, carries a trip 147, which may be rigidly secured thereto. Rigidly connected with the arm 146 is a vertical arm 148 provided at its upper end with a guide socket 149, receiving the upstanding link 150 provided at its upper end with a dog or tooth 151. This link is pivotally mounted, at its lower end, upon the arm 146 (as shown at 152), and is swung toward the segmental ratchet 139 by means of a spring 153.

Figure 5:
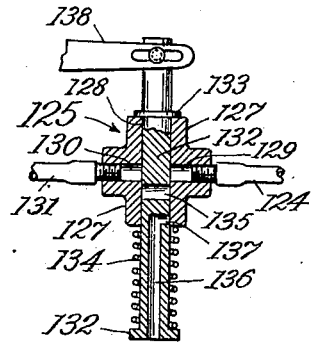
Figure 5 is a detailed section through a combined suction and exhaust valve, showing the same in the lower closed position.
Figure 4:
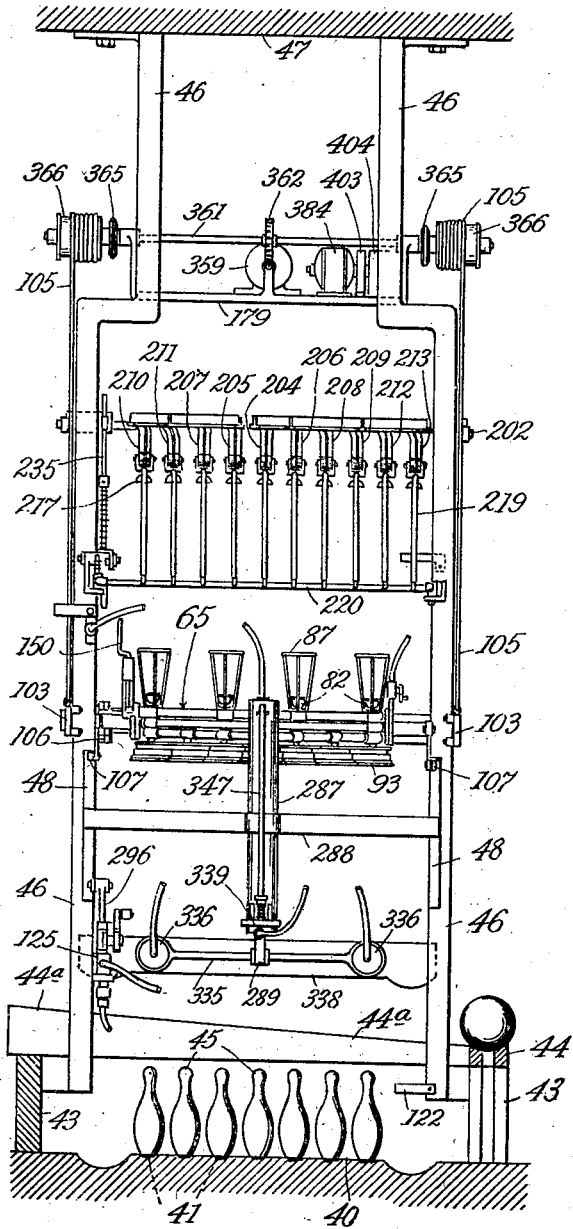
Figure 4 is an end elevation of the apparatus on line 4—4 of Figure 1.

It might be well to state the operation of the valve structure 125 and associated elements at this point. When the elevator or carriage is in the intermediate position, the valve body 132 is in the lowermost position (Figure 5), and is limited in its downward movement by the shoulder 133. Suction is now cut off from the hose 124 as the valve body covers ports 129 and 130. Assuming that one ball is now thrown and some of the pins remain standing, the elevator moves downwardly, the resetting or spotting suction devices being now in the lowermost position so that these suction devices engage the head ends of the pins, and at or shortly after this engagement the dog 151 of the link 150 engages the segmental ratchet 139 and turns the same one step, so that the parts assume the position shown in Figure 22. The valve body 132 is now elevated and port 135 connects ports 129 and 130 and suction is transmitted to the suction cups. When the elevator rises and returns to the intermediate elevated position, the suction stays on and the valve body retains its position, since roller 144 is out of the path of travel of trip 147. Upon the elevator reaching the end of its upward movement to the intermediate position, the sweeping action occurs. After the sweeping action the pins must be reset and the elevator returns to the lowermost position. When this action occurs, the dog 151 again engages the segmental ratchet 139 and turns it another step, and the pawl 143 drops behind the shoulder 145 but still holds the segmental ratchet 139 against reverse turning movement, but the roller 144 has been projected into the path of travel of the trip 147. During this action the crank or arm 138 has been further elevated, and the valve body 132 is now further raised and assumes its uppermost position wherein port 135 is out of communication with ports 129 and 130 and the exhaust port 136 has its transverse extension 137 in communication with the port 129. Suction is cut off from the hose 124 and this hose placed in communication with the atmosphere. The elevator begins to rise and the suction device will leave the pins reset in their former positions on the bed, but when the trip 147 reaches the roller 144, it will engage it and swing the pawl 143 upwardly to release the segmental ratchet 139. The spring 134 will immediately return the valve body 132 to its lowermost cut-off position (as shown in Figure 5), and when trip 147 passes above and disengages the roller 144, the pawl 143 will engage the segmental ratchet 139 one tooth ahead of its last position and the parts are restored to the starting positions.

Means are provided to collect the pins after they are knocked down and feed them to an elevated position, so that they are transferred to the setting suction device, as will be described. This means comprises a tiltable tray or platform 154 (Figures 1 and 3), pivotally supported at 155 and swung to the normal position against a stop 157 by a spring 156. In this normal position the tray is slightly inclined toward its forward end. Arranged near and above the forward end of the tray is a swinging bumper 158. This bumper preferably has its surface horizontally inclined and tapered toward the left side of the bed 40. When the tray 154 is tilted, this tilted position of the tray combined with the inclination of the bumper 158 will cause the ball to roll to the left side of the bed. Further, the tiltable tray 154 may be inclined laterally toward the left side of the bed, as indicated by the line 159. I contemplate using the laterally tilted tray alone on the inclined bumper alone or the laterally tilted tray in combination with the inclined bumper. The tiltable tray 154 is mounted within the pit 42 and a stationary tray 160 is disposed near and forwardly of the pit 42 and is supported by a bracket 161 or the like. When the tray 154 is tilted forwardly to the end of its movement, the stationary tray 160 forms a continuation of the same to receive the pins thereon. The tray 160 is inclined forwardly and is spaced vertically from the bumper 158. When the tiltable tray has its forward end depressed the pins can pass between the tiltable tray and bumper while the ball cannot pass beneath the bumper and will roll to the left side of the bed. The stationary tray 160 is provided with spaced openings or notches 162 (Figure 3) forming teeth 163 to pass through openings 164 formed in buckets 165 also having teeth 166, the two sets of teeth interfitting as shown. These buckets are adapted to pick up the pins which roll forwardly upon the forwardly inclined stationary tray 160. The buckets 165 are pivotally mounted at their bottom and forward ends, as shown at 167, in the ends 168 of bucket plates 169 which extend between and are attached to endless sprocket chains 170 included in a vertical conveyor. Each bucket is swung upwardly with relation to its bucket plate 169 by springs 171, the bucket plate serving as a stop to limit the upward movement of the bucket, which is generally horizontally arranged upon the upwardly traveling run of the endless conveyor. In order that the pins may not pass beyond the upward traveling run of the endless conveyor, a stationary stop 172, supported by brackets 172a is positioned between the sprocket chains 170 and is arranged near and slightly above the stationary tray 160. The bucket is so constructed that the pins will fall upon their sides therein. At their lower ends, the sprocket chains 170 pass about sprocket wheels 173 carried by a shaft 174 arranged in bearings 175. At their upper ends the sprocket chains pass about sprocket wheels 176 rigidly mounted upon a horizontal transverse shaft 177 with journaled bearings 178. The driving means for the shaft 177 will be described later. These bearings are carried by a horizontal frame 179.

Figure 2:
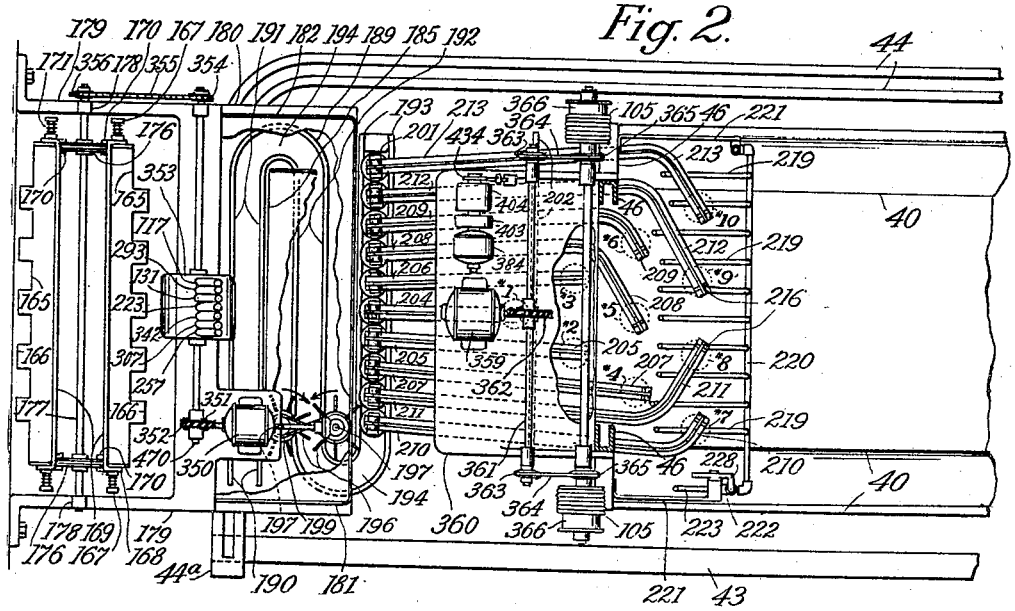
Figure 2 is a plan view on line 2—2 of Figure 1.

Arranged near and beneath the frame 179 is a second horizontal frame 180 within which is mounted a stationary hopper 181 (Figures 1 and 2). The hopper 181 includes an upper portion comprising vertical sides 182 and a vertically inclined bottom 183, the forward end of this upper portion being open. The forward end of the bottom 183 is in the path of travel of the free ends of the several buckets 165, and as each bucket approaches the hopper it is tilted downwardly upon its pivot 167 and the pins dropped into the upper portion 182 of the hopper. This stationary hopper further comprises a lower portion 184 having a rear inclined side 185, a forward inclined side 186 and inclined ends 187 providing an elongated opening or passage 188 through which the pins gravitate.

Arranged beneath the lower portion 184 of the hopper is a stationary gravity operated pin track 189, including a pair of spaced rails or rods 190. These rods are bent so that the track includes straight flights 191, 192 and 193 and curved portions 194 connecting these straight flights (see Figure 2). The track is inclined throughout its entire length excepting through the straight end-flight 193, which is horizontal. The pin will, therefore, move longitudinally of the track by gravity and feed into the horizontal flight 193. The distance between the rails or rods 190 is greater than the diameter of the head end of the pin and less than the body diameter of the pin and when the pin passes upon these rails it will gravitate to a vertical position, with the butt end up. The rails 190 in the first flight 191 are attached to the lower portion of the hopper, at the passage 188 and if desired the metal of the hopper may be bent about these rails. The hopper may constitute the supporting means for the track or additional supporting means may be provided for the same if desired. A basket 195 is arranged beneath the first flight 191 to catch any chips or other particles which may fall from the pins supported on this flight.

Means are provided to aid in feeding the vertically suspended pins into the last horizontal flight 193, so that this flight may be filled with pins in contacting relation. This means comprises rotary beaters 196 formed of leather, canvas or other material, which is sufficiently stiff to advance the pins but is flexible enough to yield when the pins are positively held against advancing movement. These feeding elements or feeders are mounted upon vertical shafts 197 journaled in bearings carried by brackets 198. These shafts are connected so that they rotate in opposite directions by the crossed belt 199 engaging pulleys 200 rigidly mounted upon the shafts 197. One shaft 197 projects above the other and is driven continuously, as will be described. The flight 193 has a stop 201 to limit the feeding movement of the pins.

Figure 21:
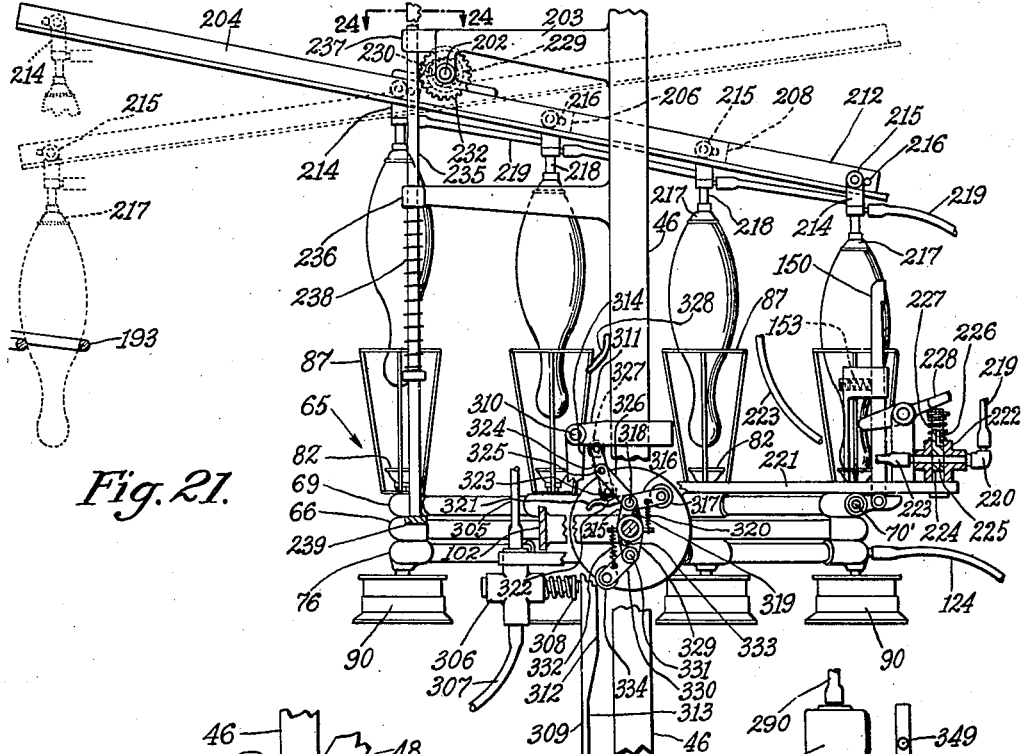
Figure 21 is a side elevation of the elevator or carriage approaching the uppermost position, in the act of receiving the collected pins for respotting after the player has finished his turn and all pins have been swept from the alley.

Transfer means are provided to lift the ten pins from within the flight 193 and coact with the elevator to transfer these pins into the wire baskets 87 of the setting frame 69. This transfer means comprises a transverse horizontal rock shaft 202, journaled in bearings carried by stationary arms 203 (Figure 21).

Arranged beneath and rigidly mounted upon the rock shaft 202 to turn therewith is a No. 1 pin rail 204; a No. 2 pin rail 205; a No. 3 pin rail 206; a No. 4 pin rail 207; a No. 5 pin rail 208; a No. 6 pin rail 209; a No. 7 pin rail 210; a No. 8 pin rail 211; a No. 9 pin rail 212; and a No. 10 pin rail 213 (Figure 2). Each of these rails is inverted T-shaped in cross section. The rail 204 is straight and terminates adjacent to the shaft 202; the rails 205 and 206 are straight and terminate some distance rearwardly of the shaft 202; the rail 207 is straight and terminates rearwardly of the rail 205; the rails 208 and 209 have laterally bent rear ends and terminate rearwardly of the rail 206 in line with the rail 207 and the remaining rails 210 to 213 have laterally bent ends terminating rearward of the rails 207, 208 and 209, in the positions shown. The rear ends of the several rails terminate in positions corresponding to the triangular group arrangement of the baskets 67, when the elevator reaches the uppermost position, the base of the triangular group being arranged rearwardly with respect to the bed, and the elevator being inverted upon its downward travel so that when the pins are set on the bed, the base of the triangular group will be arranged forwardly with respect to the bed. Mounted to travel on these several rails are carriages including yokes 214, each of which has a pair of spaced wheels 215 to run upon the horizontal web of the rail. Each rail is provided at its rear end with a stop 216 to engage with the wheels and limit the rearward movement of the carriage. The carriages have suction cups 217 suspended therefrom by tubular stems 218 and a flexible suction hose 219 is connected with each stem. These several flexible hoses 219 are connected with a common rigid pipe 220, supported by arms 221. This pipe 220 has connection with a valve structure 222 which is connected with a hose 223 feeding to a source of suction. The valve structure comprises a reciprocatory valve body 224 (Figure 21) having a transverse suction port 225 and an exhaust port 226. The valve body is held in the raised position by a spring 227 so that the suction port 225 connects the pipe 220 with the hose 223. When the valve body is depressed, the exhaust port 226 is placed in communication with the pipe 220. The valve body is depressed by a pivoted lever 228, arranged to be engaged by a lateral extension 70' of the setting frame 69, when that frame reaches its uppermost position.

Means are provided to rock the shaft 202 and tilt the several rails rigidly mounted thereon, comprising a ratchet wheel 229 (see Figures 21 and 24) which is rigidly mounted upon the rock shaft 202. This ratchet wheel is engaged by a pawl 230 pivoted at 231 to a gear 232 having teeth 233 to engage with teeth 234 of a stripped rack 235. The stripped rack operates within guides 236 and 237, and the rack is moved downwardly by a compressible coil spring 238. The rack 235 is moved upwardly by an arm 239, rigidly secured to the intermediate frame 66 (as shown in Figure 6).

It might be well to review the operation of the rock shaft 202 and associate elements at this point. The rock shaft 202 may be assumed to be in the normal position, whereby the several rails carried thereby are slightly inclined forwardly and their suction cups 217 will contact with the butt ends of the row of pins held within the straight flight 193. The valve body 224 is now in the active position so that suction is applied to these cups 217, which have holding engagement with the pins. When the elevator 65 rises and approaches the rock shaft 202, the arm 239 engages the lower end of the rack bar 235, now in the lowermost position, while its teeth 234 mesh with the teeth 233. The rack bar is raised by the elevator and turns the gear 232, and this motion is transmitted to the ratchet wheel 229 by the pawl 230. The ratchet wheel turns the rock shaft 202 and the several rails are tilted or inclined so that their rear ends are lowered and their opposite ends raised. The carriages run down the then-inclined rails and assume positions directly over the several wire guards 87. The further upward movement of the carriage causes the toothed portion of bar 235 to leave the teeth 233 of gear 232 but the weight of the pins is sufficient to retain the rails in the inclined position. The lower head ends of the pins are now directly over the wire guards 87. As the elevator continues to rise, the lowermost pins contact first with the suction cups 82, and the rails are turned in opposite directions until they are again substantially horizontal, at which time the head end of the pins engage with all of the suction cups, and suction will be applied to the head ends of the pins within the cups 82, as explained. When the carriage reached the uppermost position and the rails became horizontal, the valve body 224 was depressed and the suction cut off from the several suction cups 217 and the suction cups connected with the atmosphere. In this uppermost position, the carriage remains until automatically set into action by the throwing of the second ball, as will be described. The teeth 234 again engage the teeth 233, but the gear 232 will not turn the rock shaft 202 on account of the pawl and ratchet connection. The rock shaft is returned to the normal position by a spring 240 (Figure 24). This spring returns the rails to the normal inclined position with the forward end lowered, and the several carriages will gravitate toward the forward ends of the rails to be in a row directly over the pins in the flight 193 of pin track 189. Suction is not again applied to the cups 217 until the elevator begins to descend and has traveled downwardly a sufficient distance so that the lever 228 is freed by the extension 70' of the setting frame (Figure 6).

Figure 3:
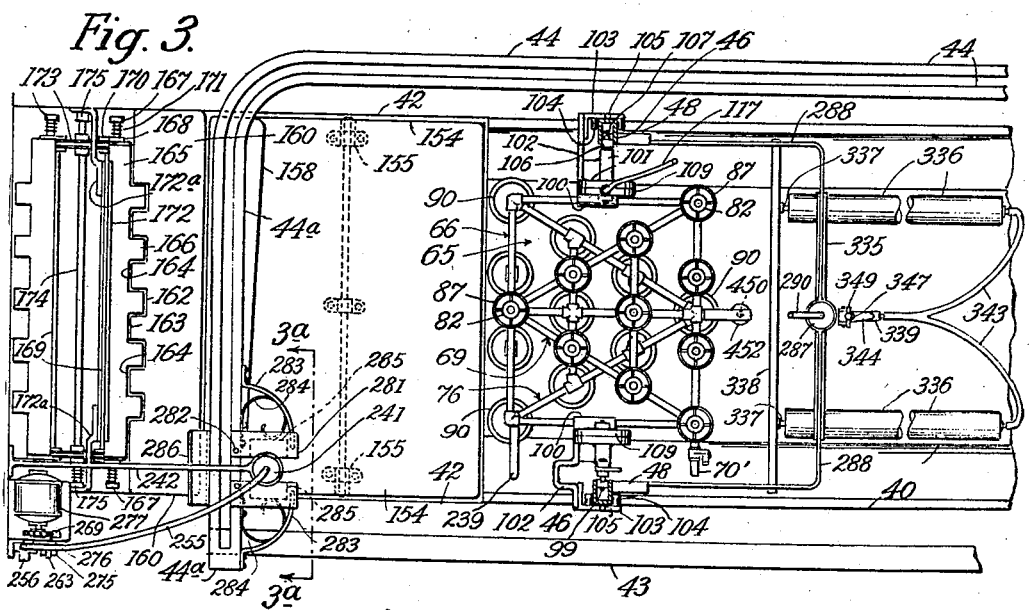
Figure 3 is a plan view on line 3—3 of Figure 1.

Means are provided to pick up the ball after it is thrown upon the tiltable tray and transfer the same to the ball return runway 44. This means comprises a vertical cylinder 241 supported by a stationary horizontal arm 242 (Figures 1 and 3). Arranged within the cylinder 241 in spaced concentric relation thereto is an inner cylinder 243 producing a passage 244 (Figure 23). This inner cylinder has openings 245 formed therein near its lower end. The lower ends of the outer and inner cylinders are closed by a head 246. A plunger 247 is mounted to reciprocate within the inner cylinder 243 and carries a tubular rod 248, the bore of the tube extending through the top of the plunger 247 (as shown). The tubular rod 248 extends through the head 246 and has a suction cup 249 secured to its lower end. Arranged beneath the plunger 247 is a compressible spring 250. The inner cylinder 243 has its upper end covered by a head 251 having a reduced port 252, much smaller in cross sectional area than either of the openings 245. The top of the outer cylinder 241 is also covered by the head 251. This head has a large transverse port 253 in communication with the passage 244 and with a tubular nipple 254 connected to a flexible hose 255. The cylinder 241 is arranged over the lowest point of platform 154. The flexible hose 255 (Figure 1) is connected with a valve device 256, also connected with a flexible hose 257, which leads to a source of suction. The valve 256 (Figure 11) has a main bore to receive a reciprocatory valve body 258 having a transverse port 259 to register with port 260 of valve casing 256 when the valve body 258 is moved inwardly, in opposition to a spring 261. The valve body has an exhaust port 262 adapted to communicate with the port 260 when the port 259 is out of communication with the port 260. The valve body 258 projects outwardly beyond its casing and is arranged to engage with a vertical cam lever 263, which is pivoted at its upper end, as shown at 264, to a stationary support 265. The cam lever has an intermediate straight raised portion 266 and depressed end portions 267 and 268. Arranged near and upon one side of this cam lever is a vertical rack bar 269 operating within suitable stationary guides 270 (Figure 1). This rack bar carries an arm 271 pivoted thereto at 272 and arranged above a stop 273, which is fixed to the rack bar. The arm is moved downwardly into engagement with the stop by a spring 274. The arm 271 carries a roller 275 to engage with the cam lever. It is thus seen that when the rack bar 269 moves upwardly that the arm 271, being prevented from turning downwardly upon its pivot by the stop 273, will cause its roller 275 to shift the cam lever 263 toward the valve 256 and thereby cause port 259 to establish communication with port 260, thereby connecting hose 255 with hose 257. This communication is maintained while the roller engages the straight raised portion 266 of the cam lever, and is broken when the roller engages the depressed portions 267 and 268, at which time spring 261 will return the valve body to the exhaust position. When the rack bar moves downwardly, the lever 271 turns upwardly and its roller will not depress the cam lever 263. The rack bar 269 is engaged by a pinion 276 driven by a reversible motor 277. This motor is connected in a circuit including a switch 278 which is closed when the tiltable tray 154 has its forward end swung downwardly. A reversing switch 279 is also connected in this circuit, and is adapted to be engaged by a trip arm 280 when the rack bar reaches the end of its upward level.

Figure 3A:
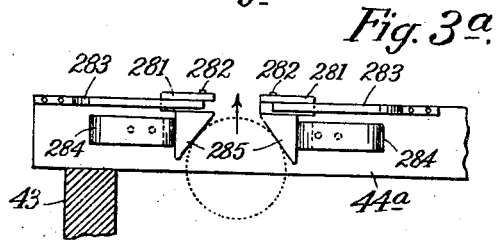
Figure 3a is an end elevation on line 3a—3a of Figure 3.

The suction cup 249 and tubular rod 248 are arranged to travel through a space between leaves 281 (Figures 1, 3 and 3a). These leaves are pivoted at 282 to swing horizontally outward upon stationary tracks or supports 283 and are urged inwardly by springs 284. These leaves have inclined jaws 285 depending therefrom and diverging downwardly to be engaged by the lifted ball and to thereby separate the leaves. When the ball has passed to the top of these leaves, the latter return to their inward position and the ball is released and rolls rearwardly upon the leaves, since they are slightly longitudinally inclined forwardly, and then passes into the transverse portion 44a of the ball return raceway 44. The numeral 286 designates a stop element to limit the rearward travel of the ball when passing from the leaves 281.

The operation of the ball pick-up and transfer means will now be given. When the ball is thrown and passes upon the tiltable tray 154, with or without pins falling thereon, the tray is tilted and its forward end depressed. When this occurs the switch 278 is closed and the circuit for the motor 277 is closed and the motor started. The motor now operates to elevate the rack bar 269, and arm 271 travels upwardly and depresses the raised portion 266 of the cam lever 263 to actuate the valve device 256, so that the hose 255 is placed in communication with hose 257. When this occurs, suction is transmitted through the hose 255 into the upper end of the outer cylinder 241. Some of this suction is broken through the port 252, while the suction also passes through the passage 244, and through port 245 to the cylinder 243 beneath the plunger 247. The port 252 being now in communication with the atmosphere, since the cup 249 has not as yet engaged the ball, the suction beneath the plunger 247 is greater than the suction above the plunger and this increased suction is sufficient to overcome the action of the spring 250 and moves the plunger 247 downwardly. By this time, the ball has rolled to the lowermost point of the platform 154 directly beneath the cylinder 241, and the suction cup 249 will now be brought down upon the ball and will instantly grip the ball. The presence of the ball in the suction cup will close the bore of the rod 248 so that the suction on top of the plunger 247 is greater than that on the bottom and this preponderance of suction combined with the action of the spring 250 will elevate the plunger 247. The suction cup 249 is accordingly raised and the ball is raised between the pivoted leaves 281 and is supported above them and is placed upon the upper surfaces of the same as the leaves close. At about this time, the roller 275 on the rack bar 269 passes upon the depressed portion 268 of cam lever 263 and the spring 261 of the valve 256 is free to shift the valve body 258 to its outer position thereby cutting off suction to the cylinder 241 and placing this cylinder in communication with the atmosphere. The ball is freed from engagement with the suction cup 249 and will then roll rearwardly upon the inclined leaves and pass into the transverse portion 44a of the ball return raceway. The continued operation of the motor 277 brings the trip arm 280 into engagement with the reversing switch 279 thereby lowering the rack bar 269 to its starting position.

Figure 22:
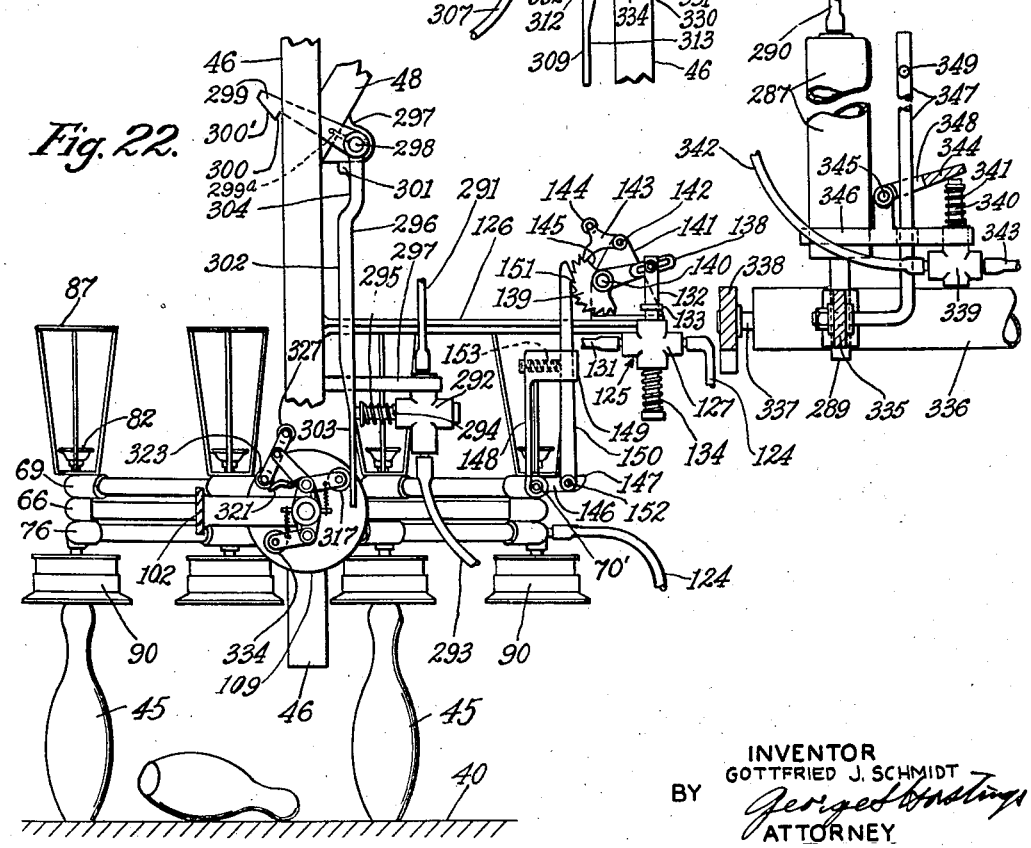
Figure 22 is a similar view, showing the elevator or carriage in the lowermost position, in the act of resetting the pins left standing after the first ball is thrown and raised by the elevator for sweeping of the alley.

Means are provided to sweep the pins knocked down after the first ball is thrown and also after the section ball is thrown, if necessary. This means comprises a suction device including an outer vertical cylinder 287 (Figures 1, 3, 4 and 22) rigidly mounted upon a stationary horizontal arm 288 and a tubular rod 289. The cylinder 287 is similar in construction to the cylinder 241, in Figure 23, the rod 289 corresponding to the rod 248 and all other parts being identical excepting that the spring employed, corresponding to the spring 250, is sufficiently heavy to raise the plunger rod 289 and all mechanism carried thereby. This spring is the sole means for raising the rod as the lower end of the rod is permanently open, and when suction is transferred to the interior of the cylinder 287, the rod 289 is shifted downwardly. Leading into the upper end of the cylinder 287 is a flexible hose 290 corresponding to the hose 255. The hose 290 is connected with a hose 291 which extends downwardly and is connected with a valve device 292 supported on a bracket 297 attached to one of the guide tracks 46 (Figure 1). The valve device 292 is connected with a flexible hose 293 which leads to a source of suction. The valve device 292 includes a valve body 294. This valve device is identical with the valve device shown in Figure 11, excepting that the exhaust port 262 is omitted. The valve body is held in the closed position by a spring 295 and is shifted inwardly to establish communication between the flexible hoses 291 and 293, by a vertically arranged cam lever 296. This cam lever is pivoted at 298 to a stationary bracket fixed to track portion 48. A finger 299 loosely mounted on pivot 298 is provided with a hook or tooth 300 furnishing a cam surface 300', the finger passing through slots in track 46 and normally being held upwardly against a stop portion of the track by a suitable spring 299a. The cam lever 296 has a lug 301 integral therewith to engage the bracket 297 and limit the movement of the cam lever from the valve device. This cam lever has an intermediate raised portion 302 and end depressed portions 303 and 304, as shown in Figure 22. Connected with the hose 290 is a flexible hose 305 having a valve device 306 connected therein and this valve device is connected with a flexible hose 307 leading to the source of suction. The valve device 306 is identical with the valve device 292 and includes a spring-pressed valve body 308 (Figure 1). This valve body is normally held by the spring in the closed position to break communication between the hoses 305 and 307 and establish communication between these hoses when the valve body is pressed inwardly by a cam lever 309. The cam lever 309 is vertically arranged and is pivotally supported at 310 from a fixed bracket 311. This cam lever has an intermediate raised portion 312 and end depressed portions 313 and 314 (as shown in Figure 21). The cam levers 296 and 309 are arranged at different elevations, for a reason to be described.

The means to operate these cam levers for effecting the sweeping operation will now be described, attention being called particularly to Figures 1, 6, 21, 22 and 30. One of the trunnions 99 of the carrier is furnished with a collar 99a secured thereto (Figures 6 and 30), which as shown in Figures 21 and 22, has opposed knuckles 315 and 329 rigidly mounted thereon. On knuckle 315 is arranged a trip lever 316 carrying a roller 317 at its free end, and pivoted to the knuckle 315 at 318. A stationary stop 319 is provided to limit the inward or downward movement of the trip arm 316 and this trip arm is swung downwardly by a spring 320. The trip arm 316 breaks upwardly and the roller 317 is adapted to engage the cam lever 296, in a manner to be explained. Rigidly attached to the inner end of the trip lever 316 is a tail 321, which may be rigid and has a depression or pocket 322 to receive the roller 323 carried by a locking lever 324 pivoted between its ends at 325 on an arm 326 integral with knuckle 315. At its upper end the locking lever 324 carries a roller 327 to engage behind a stationary trip 328 (Figures 1 and 21) arranged as shown. The knuckle 329 supports a trip arm 330 pivoted thereto at 331 and swung upwardly by a spring 332 to engage a stop 333. The trip 330 carries a roller 334 at its free end to engage with the upper cam lever 309. The trip arm 330 breaks downwardly upon its pivot. The roller 327 is adapted to be engaged by the cam surface 300' and by cam or trip member 328 on tracks 46, 48, respectively, to swing the locking lever 324 in opposite directions to render the roller 317 operative and inoperative.

In view of the foregoing description, it will be seen that when the elevator 65 is stationary at the intermediate position shown in Figure 1, that as soon as the first ball is thrown and some of the pins left standing, the elevator will be set into action to elevate and reset these pins, and the sweeping action must also occur in proper relation to the manipulation of the pins. When the elevator descends so that its suction cups engage the standing pins, the roller 317 engages the cam lever 296 but does not shift this cam lever upon its pivot since the trip lever 316 breaks upwardly. The roller 317 will now engage the depressed lower end of the cam lever 296. When the elevator starts to rise, carrying with it the standing pins, the trip arm 316 will positively shift the cam lever 296 outwardly, whereby its lower end will act upon the valve body 294 and move the same inwardly for supplying suction to cylinder 287, and the vertical tubular rod 289 will descend. This will permit of the sweeping action to occur before the elevator reaches the normal intermediate position and again starts to descend. When the roller 317 travels upon the upper depressed portion 304 of the trip lever 303, the valve body 294 is again shifted to the outer cutoff portion since the cam lever 296 returns to the normal vertical position under the action of spring 295. When the elevator travels from the lowermost position to the intermediate position, and the trip arm 316 has actuated the cam lever 302 to actuate in turn the sweeping means, the roller 327 of the locking lever 324 engages the cam surface 300' of the finger 299 (Figure 22), with the result that the lower roller 323 engages and depresses the tail 321 and enters the pocket 322 to be held therein and released, and this action now shifts the roller 317 out of the path of travel of the raised portion 302 of the cam lever 296, into its inoperative position.

After the elevator 65 reaches the intermediate position, it immediately descends and resets the pins, and the elevator then again rises and travels upwardly. During this movement the roller 327 clears the finger 299 and roller 317 does not engage lever 296, so that the sweeping mechanism is inactive. The elevator continues in its upward movement into its uppermost pin receiving position, and remains in this position. At the end of the upward movement of elevator 65, roller 327 travels beneath the stationary trip 328 and is moved towards track 46, whereupon roller 323 disengages the tail 321 so that the trip arm 316 is returned to the normal active position. The purpose of the locking arm 324 and associated element is to hold the trip arm 316 out of the active position, when the elevator is approaching the uppermost position, after the pins have been reset to then prevent the sweeping action. The elevator stops at the uppermost position and again descends after the second ball has been thrown, and the bed is swept before the elevator reaches the lowermost position. When the elevator approached the uppermost position, the trip arm 330 did not actuate the cam lever 309 because such trip arm broke downwardly and the roller 334 passed upon the upper depressed end of the cam lever 309. However, as soon as the elevator begins to travel from the uppermost position toward the lowermost position, the trip arm 330, due to roller 334 moving from depressed portion 314 onto high portion 312 of lever 309, shifts the cam lever 309 to the left, thereby actuating the valve device 306 and supplying suction to the cylinder 287 whereby the plunger rod 289 and elements carried thereby descend, and the sweeping action occurs, which is completed when the roller 334 passes upon the lower depressed end 313 of the cam lever 309.

After a new set of pins have been set on the bed, the elevator returns upwardly to its intermediate position, so that the cycle of operations may be repeated in connection with the playing of the next frame. During the downward setting movement and return upward movement, the finger 299 and lever 296 are not operated, as the collar 99a partakes of the inverting movement of the carrier and rollers 317 and 327 are displaced through half revolutions from their operative positions with respect to finger 299 and lever 296. As rollers 317 and 326 are located in different planes (Figures 6 and 30), no roller can coact with the part intended to be engaged by any other roller so that the possibility of the sweeping mechanism being operated when not desired is avoided.

When the elevator moves downwardly from the intermediate position and picks up the standing pins if any, and starts to move upwardly to return to the intermediate position, the sweeping mechanism is thrown into action and the sweeping action is completed before the elevator again starts to travel downwardly from the intermediate position. When the elevator has reset the pins and again travels upwardly, the sweeping mechanism is not actuated and the elevator continues its upward movement until its uppermost position is reached. As soon as the elevator again starts to travel downwardly with a new set of pins for this uppermost position, the sweeping mechanism is set into action and the sweeping operation completed before the elevator reaches the lowermost position.

As shown in Figures 1, 3 and 22, the plunger rod 289 of cylinder 287, which is open at its lower end, carries a horizontal transverse bar 335 to which a pair of spaced horizontal suction-operated devices embodying cylinder 336 are rigidly secured. The cylinders 336 are identical in construction with cylinder 241 (shown in Figure 23), and have tubular rods 337 carrying a sweep 338 rigidly attached to their forward ends. A valve device 339 (Figures 1 and 22), is provided, which is identical with the valve device shown in Figure 11, except that the exhaust port 262 is omitted. This valve device includes a valve body 340, moved outwardly by a spring 341, and in this outer position the valve body breaks communication between a suction hose 342 and a hose 343, which is branched and leads to the outer ends of the cylinders 336. When the valve body 340 is moved inwardly by a lever 344, hose 342 is placed in communication with hose 343 and suction is transmitted to the cylinders 336. The lever 344 is pivoted at 345 upon a stationary bracket 346 also supporting the valve device 339. A vertical actuating rod 347 passing through an opening 348 in the lever 344 is rigidly secured at its lower end to the transverse bar 335. Near its upper end the rod 347 carries a transverse pin 349 adapted to engage and depress the lever 344 when the transverse bar 335 reaches the end of its downward travel adjacent to the bed. It is thus seen that when the plunger rod 289 is projected downwardly so that the transverse bar 335 is in its lowermost position, suction will then be supplied to the cylinders 336 and the sweep 338 projected forwardly to sweep all the pins, either standing or fallen, into the pit 42. As soon as the bar 335 rises for a slight distance suction is cut off from the cylinders 336 and the springs within these cylinders will immediately retract the sweep 338 so that it occupies a position adjacent to the forward ends of the cylinders 336 (as shown in Figure 22).

Attention being called now to Figure 1, the number 350 designates a motor which is continuously driven while the apparatus is in operation. This motor drives a worm 351 driving a worm wheel 352 on a shaft 470 which operates a suction pump 353 connected with the several pipes 117, 131, 223, 257, 293, 307 and 342. The worm wheel 352 also drives a sprocket wheel 354 driving a sprocket chain 355, in turn engaging a sprocket wheel 356 which drives the shaft 177. The motor also drives a bevel gear 357 engaging a bevel gear 358 rigidly mounted upon the upper end of one of the vertical shafts 197. It is thus seen that the endless conveyor including the buckets, the suction pump 355, and the rotary beaters 196 are continuously driven.

The numeral 359 designates a reversible motor mounted upon a stationary platform 360. This motor drives a shaft 361 through the medium of speed reducing gearing 362 and the shaft 361 is provided at its ends with sprocket wheels 363, driving sprocket chains 364, engaging sprocket wheels 365, rigidly connected with drums 366, to turn therewith, these drums having the cables 105 wound thereon. It is thus seen that when the cables 105 are wound upon the drums 366 that the elevator 65 rises and when the cables pay out the elevator is lowered by gravity.

Figure 26:
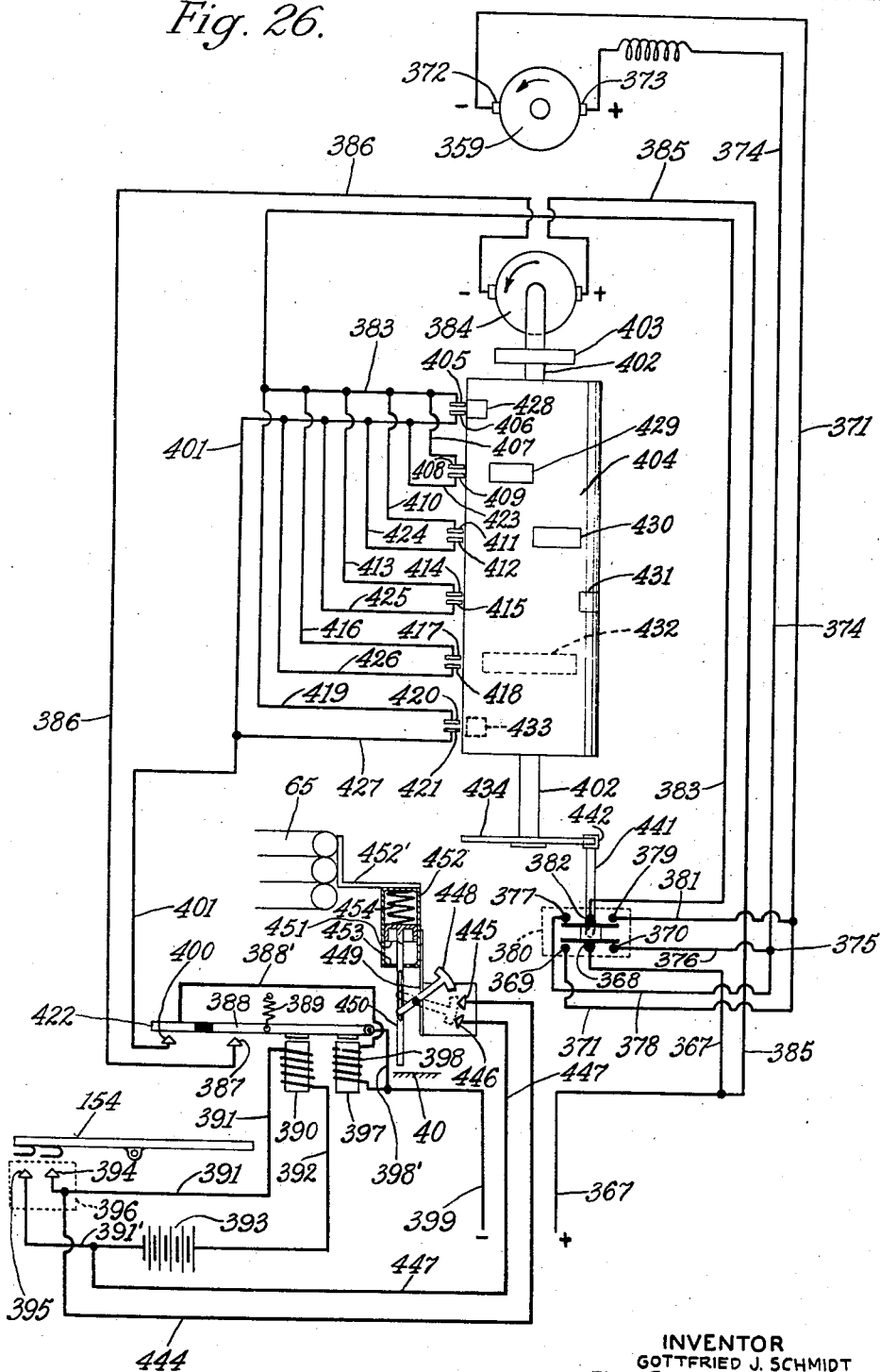
Figure 26 is a diagram of the electrical circuits for automatically operating the pin spotting and resetting elevator.

Attention is now called to Figure 26 showing the electrical circuits operating the elevator 65. The motor 359 is preferably driven from a source of current of 110 v. A. C. A wire 367 is connected with the positive pole of this source of current and this wire is connected with a movable contact blade 368 arranged between stationary contacts 369 and 370. The contact 369 is connected with a wire 371 which is connected with the positive side 372 of the motor while its negative side 373 is connected with a wire 374 extending to the point 375 and there connected with a wire 376 connected with the contact 370. A stationary contact 377 is connected with a wire 378 and this wire leads to the point 375 and is there connected with the wire 374. A stationary contact 379 is connected by a wire 381 with the wire 371. A movable contact blade 382 is arranged between the stationary contacts 377 and 379 and is connected with a common return wire 383. Movable contacts 368 and 382 are insulated from each other but are shifted as a unit so that the blade 368 may engage contact 369 while blade 382 engages contact 377; or blade 368 may engage contact 370 while blade 382 engages contact 379. These several contacts constitute a reversing switch 380 to reverse the operation of the motor 359. The switch blades 368 and 382 are shifted in opposite directions, by means to be described.

The number 384 designates a motor which is driven in the same direction during its operation and this motor has one pole connected with a wire 385 which is connected with the wire 367. The opposite pole of this motor is connected with a wire 386 which is connected with stationary contact 387. The stationary contact 387 is adapted to electrically engage the armature of a relay 388 against the pull of a spring 389, when an electro-magnet 390 is energized, this electro-magnet being connected by wires 391 and 392 to a local source of current 393. The local current is closed by contacts 394 and 395 included in a switch 396 arranged beneath the tray 154 and closed when the forward end of the tray is depressed. A second electro-magnet 397 is arranged beneath the armature 388 and has its winding 398 electrically connected with an insulated extension 422 of the same and with a wire 399 which leads to the negative pole of the line current. Arranged beneath the extension 422 is a stationary contact 400 connected with a wire 401 included in the circuit for the motor 359. It might be stated at this point that when the local circuit is closed at points 394 and 395, the two motor circuits are closed at points 387 and 400 and are held closed by the then energized magnet 397, when the local circuit opens, and until an automatic switch in turn opens these motor circuits. The contact 400 may engage armature extension 422 which is carried by and insulated from the armature. The winding of the electro-magnet 397 is connected by a wire 388' with the extension 422. A wire 398' connects armature 388 and wire 399.

Figure 27:
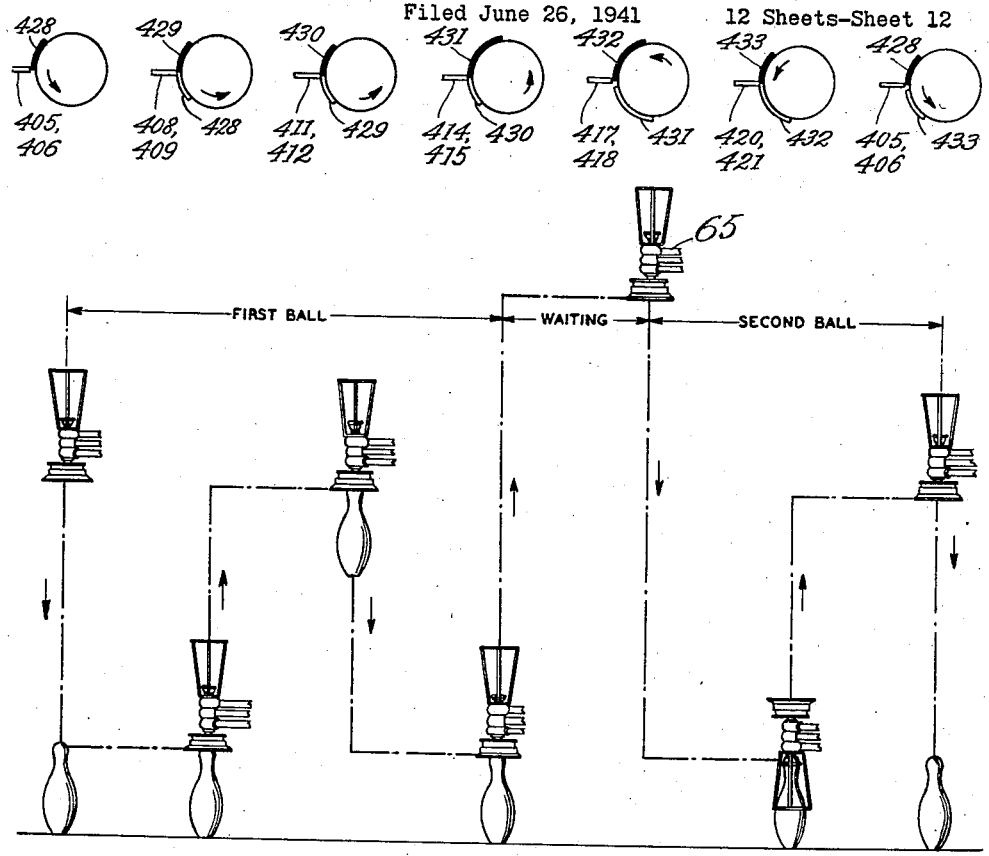
Figure 27 is a diagrammatic view illustrating the relative positions of the switch segments and the elevator or carriage, during one cycle of operation of the apparatus.

The motor 384 drives a shaft 402 through the medium of reducing gearing 403 and this shaft carries an insulating drum or cylinder 404. Connected with the common wire 383 is a stationary contact or brush 405 having a companion contact or brush 406 arranged near and spaced from the same. A branch wire 407 is connected with the wire 383 and is connected with a stationary contact 408 having a companion contact 409. A branch wire 410 is connected with the wire 383 and has a stationary contact or brush 411 connected therewith which has a companion stationary contact or brush 412. A branch wire 413 is connected with the wire 383 and with a stationary contact or brush 414 which has a companion stationary contact 415. A branch wire 416 is connected with the wire 383 and has a stationary contact 417 connected therewith which also has a companion stationary contact 418. A branch wire 419 is connected with the wire 383 and has a stationary contact or brush 420 connected therewith, which also has a companion stationary contact 421. The companion contact 406 is connected with a wire 401; the companion contact 409 is connected by a wire 423 to the wire 401; the companion contact 412 is connected by a wire 424 with the wire 401; the companion contact 415 is connected by a branch wire 425 with the wire 401; the companion contact 418 is connected by a wire 426 with the wire 401; and the companion contact 421 is connected by a branch wire 427 with the wire 401. Mounted upon the insulating cylinder or drum 404 is a segmental contact 428 of a width to span and connect contacts 405 and 406; a segmental contact 429 of a width to span and connect the contacts 408 and 409; a segmental contact 430 of a width to span and connect contacts 411 and 412; a segmental contact 431 of a width to span and connect contacts 417 and 418; and a segmental contact 433 of a width to span and connect contacts 420 and 421. The relative circumferential positions of the contacts 428 and 433 are shown in Figure 27.

Means are provided, which are driven in timed order with respect to the insulating drum 404 to reverse the reversible switch, such means comprising a disk 434 (Figure 29), which is circular and is rigidly mounted upon the shaft 402. The disk is provided upon its periphery with depressions 435, 436 and 437 and raised portions 438, 439 and 440. The reversible switch comprises a pivoted arm 441 carrying a roller 442 which rides upon the periphery of the disk to engage with the raised and depressed portions and is forced inwardly by a compressible coil spring 443. The contacts 368 and 382 are mounted upon the arm 441 and are shifted thereby to engage, respectively, with contacts 369 or 370; and 377 or 379. Connected with the wire 391 is a wire 444 leading to a stationary contact 445. A companion stationary contact 446 is connected by a wire 447 with the wire 391'. A movable contact blade 448 is arranged to pass between contacts 445 and 446 and electrically connect them. The blade 448 is pivoted on a bracket 449 carried by a dash-pot 452 and is connected with a rod 450 attached to the plunger 451 of the dashpot 452 which has a contracted exhaust port 453 and a spring 454. The dashpot 452 is attached to the elevator 65 by a bracket 452' and the contacts 445 and 446 are mounted on the bracket 449.

In Figure 25 is shown a circuit for actuating the motor 277 which operates the ball lifting device. In this figure a local circuit is shown comprising a battery or other source of current 460, one pole of which is connected with one terminal or contact point 461 of the switch 278, the other terminal or contact 462 of which is connected with a wire 463. This wire is connected with one end of the winding of an electromagnet 464, the other end of which is connected with a wire 465 connected with the opposite pole of the source of current. When the tiltable tray 154 is depressed by a ball thrown on the same, the local circuit is closed at the points 462 and 461 and the electro-magnet 464 is energized. This electro-magnet serves to draw down an armature 477 which will remain set in the raised or lowered position. This armature is electrically connected with a wire 466 connected with the negative pole of the line current. A wire 467 is connected with the negative pole of the positive pole of the line current and leads through switch 279 to the positive pole of the motor 277, the negative pole of which is connected by a wire 468 with a stationary contact 469 arranged beneath the armature 477 and adapted to engage therewith. The reversing switch 279 connected in the wires 467 and 468 has an arm 471 arranged in the path of travel of trip arms 280 and 472 rigidly mounted upon the rack bar 269. A lever 474 is pivoted at 475 and is arranged to raise the armature 477 to break engagement at the contact 469. Lever 474 carries a knee joint extension 476 arranged to break upwardly. When the tiltable tray 154 has its forward end depressed by the pins or ball, or both, passing thereon, the switch 278 is closed and the electro-magnet 464 energized whereby the armature 477 moves downwardly and closes the circuit for the motor 277 at the contact 469. The rack bar 269 being in the lowered position, the reversing switch 279 is set to cause the motor 277 to rotate in a direction to raise the rack bar 269 which occurs so that valve 256 may be actuated to supply suction to the cylinder 241. The motor is, therefore, set into action to raise the rack bar and the motor continues to drive in that direction until the rack bar 269 has been elevated a sufficient distance so that trip 280 will engage lever 471 and shift the same upwardly thus reversing the direction of the motor and causing rack bar 269 to travel downwardly. When this occurs and the rack bar reaches the end of its downward travel, trip 473 will engage extension 476 and swing the other end of lever 474 upwardly to open the motor circuit at 469, trip 472 at this time also engaging arm 471 to reverse the motor switch ready for the next elevation. When the pins and ball discharge from the tilted tray 154, the local circuit is opened at 278, but the motor circuit will remain closed at 469 until the armature 477 is raised to disengage contact 469 which will occur after the motor has been driven in one direction to elevate the rack bar 269, then reversed and driven in opposite direction until the rack bar is moved to the lowermost position in which the motor is stopped.

Figure 29:
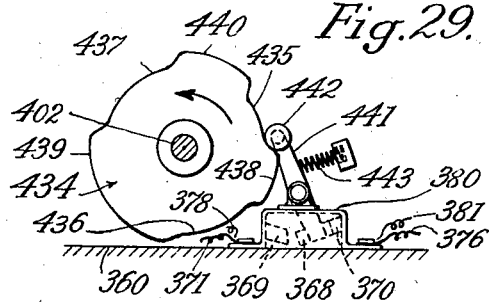
Figure 29 is a side elevation of the reversing switch and operating means shown in Figure 26.

The operation of the apparatus is as follows:

In Figure 1 the elevator is shown in the normal or intermediate position and is stationary with the pins 45 set on the bed. The motors 359, 384 and 277 are now at rest while motor 350 is continuously driving. The circuits for the motors 359 and 384 are now open at the contacts 387 and 400 (Figure 26), while contacts 405 and 406 are engaging the leading end of contact segment 428; and roller 442 is engaging the leading end of depression 435 (Figure 29). The first ball is now thrown and rolls upon the tilting tray 154 depressing the forward end thereof and closing the local circuit of Figure 26 between the points 394 and 395. In the closed circuit, current flows from one pole of the battery 393 through wire 392, electro-magnet 390, wire 391, contact points 394 and 395 and through wire 391' back to the source of current. This energizes electro-magnet 399 and the armature 388 of the relay is drawn down and the motor circuits closed at contact points 387 and 400. In the closed circuit for the motor 284 current passes from the positive pole of the source of current through wire 367, wire 385, to one pole of the motor 384, returning through wire 386, contact point 387, armature 388, wire 398' and through wire 399 back to the opposite pole of the source of current. The magnet 397 is a holding magnet and retains the relay closed after the local circuit is opened by removing the ball and pins from tray 154, the motor circuit remaining closed until it is opened by the operation of the automatic drum switch 404 including the several contact segments. The first ball having been thrown and the contacts 387 and 400 closed by the tilting of tray 154, motors 359 and 384 are set into operation. When the circuit for the motor 359 is closed, current will now flow from the positive side of the line circuit through wire 387 to contact 368 through contact 370 in engagement therewith to point 375 through wire 374 to the positive pole of the motor 359, returning from the negative pole 375 through wires 371 and 381 to contact 379, to contact 382 in engagement therewith, through wire 383, through contact 405, through segmental contact 428, through contact 406, through wire 401, through contact 400, extension 422 through wire 388', through the winding 398 of the holding magnet and through the wire 399 back to the negative pole of the line circuit. The motor 359 is thus set in action and drives in a direction to lower the elevator 65 to pick up the pins remaining standing after the first ball is thrown. The various relative positions of the elevator and contact segments are shown in Figure 27. The motors 359 and 384 are timed in operation, and when the motor 359 has driven sufficiently to bring the elevator 65 to the lowermost position so that the resetting suction cups 93 properly engage with the head ends of the standing pins, motor 384 has turned the cam 434 sufficiently so that the roller 442 travels upon the raised portion 438 of the disk 434 and the reversible switch 380 is actuated so that blade 382 engages contact 377 and blade 368 engages contact 369. Current is now supplied to the motor 359 to drive the same in a reversed direction while the disk 434 continues to rotate in the same direction and contacts 408 and 409 engage the contact segment 429 before contact segment 428 is disengaged by its contacts. Hence the motor 359 is now operated to raise the elevator to the intermediate position, whereby the standing pins are raised from the bed; and during this period the bed is swept, as explained. By the time the elevator has reached the intermediate position, the roller 442 passes off the raised portion 438 and engages with the depressed portion 437 and this will reverse the direction of the motor 359, the circuit of the motor 359 remaining closed as contacts 411 and 412 engage contact segment 430 before contact segment 429 is disengaged by its contacts. The motor 359 now lowers the elevator which descends and resets the pins on the bed. The disk 434 then has been turned until the roller 442 starts to travel upon the raised portion 439, thus again reversing the direction of the motor 359; the motor circuit remaining closed since contacts 414 and 415 engage with contact segment 431 before contact segment 430 is disengaged by its contacts. The contact segment 431 and the raised portion 439 of disk 434 are correspondingly greater in length so that motor 359 will now carry the elevator past the intermediate position to the uppermost or reloading position, and when this uppermost position is reached, the circuit for the motor 359 is opened and this motor stopped since contacts 414 and 415 are now disengaging contact segment 431. The circuit including the holding magnet 397 is, therefore, opened and contact 387 disengages armature 388 and contact 400 disengages contact 422. The elevator is, therefore, stopped at the uppermost position, but there is sufficient overrun of the motor to cause contacts 417 and 418 to engage contact segment 432 after the opening of the motor circuit. The elevator 65 receives the load of fallen pins and is now brought to rest at the uppermost position, as stated, and this is the end of the cycle of operation of the first ball. The elevator 65 is now at the waiting position. When the second ball is thrown, the local circuit closes the relay contacts 387 and 400 and the circuits for the motors 359 and 384 are again closed. When the elevator is raised to the uppermost position, the roller 442 passes off the raised portion 439 and engages the depressed portion 437. This depressed portion 437 and contact segment 432 are of the same angular length as the raised portion 439 and contact segment 431, respectively, so that the motor 359 will be driven in a direction to lower the elevator and bring the elevator to the lowermost position to reset the pins on the bed. When the elevator reaches the lowermost position, roller 442 engages the raised portion 440 and the direction of the motor 359 is reversed to return the elevator to the intermediate or normal position, at which time the circuit for the motor 359 is opened since contacts 420 and 421 disengage contact segment 433 before contact segment 428 is engaged by its contacts. After this motor circuit is thus opened, there is sufficient overrun of the motor and associate elements to bring the contacts 405 and 406 into engagement with contact segments 428. The elevator, therefore, is brought to rest at the intermediate position, with the pins set, and this completes the cycle of operation caused by the throwing of the second ball. When the elevator started from the uppermost position the sweeping means was thrown into action and the bed swept before the elevator reached the lowered position to reset the pins. The sweeping means was not thrown into action when the elevator moved downwardly from the intermediate position to spot the pins since the trip lever 316 was then locked in the inactive position, as described, but this trip lever was restored to the active position when the elevator reached the uppermost ball return race-way 44, as explained.

When each ball is thrown, the switch 278 is closed and the motor 277 set into action whereby the rack bar 269 is operated and the suction means including the cylinder 241 is set into action to pick up the ball and transfer the same to the ball return race-way 44, as explained.

Figure 28:
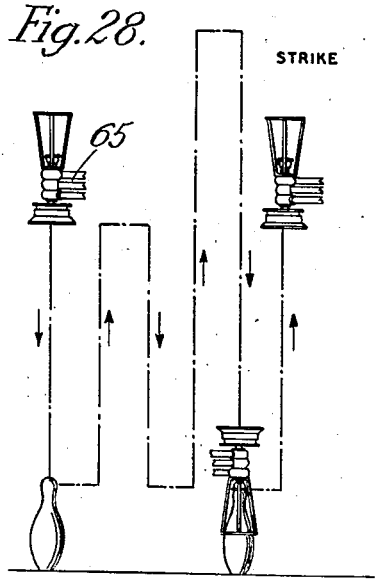
Figure 28 is a diagrammatic view illustrating the positions of the elevator or carriage during the cycle of operations, in case a strike is made by the first ball.

When the first ball is thrown, and if a strike is made, the circuits for the motors 359 and 384 are closed and the elevator travels downwardly, as described in connection with the throwing of the first ball. However, since there are no standing pins, the elevator will descend a short distance beyond the lowered position, at which it would have stopped had there been standing pins, since these standing pins take up some of the overrun of the motor and parts. Hence, when there are no standing pins the elevator moves down a greater distance and under that condition the rod 450 attached to the elevator 65 contacts with the bed and this rod has relative upward movement with respect to the dashpot cylinder 452. When this occurs, contact blade 448 moves between contacts 445 and 446 and closes the local circuit including the battery 393 at a point other than the points 394 and 395 and retains this local circuit closed for a prolonged period. The action of the dash pot is such that it will retard the downward movement of the rod 450 when the elevator rises until a new cycle of operation is repeated at which time the circuit will be opened at the points 445 and 446. In this new cycle of operation (Figure 28) the elevator moves downwardly from the intermediate position to the lowermost position, returns to the intermediate position, again moves to the lowermost position, then moves to the uppermost position and again descends to the lowermost position to spot the pins and then moves to the intermediate position where it stops. The elevator stops in this last intermediate position by the breaking of the circuit at the points 445 and 446 by the action of the dashpot means, as explained. When a strike has been made and the elevator moves down to the lowered position, and then moves up to the first intermediate position, the sweeping action occurs in the usual manner and the sweeping action will also occur when the elevator travels from the uppermost position toward the bed, although there are no pins to be swept.

When the elevator is in the intermediate or normal position, the suction cups 93 are in the lowermost position and remain in this position when the elevator travels to the uppermost position, since rollers 107 pass upwardly through the channel tracks 46 (Figure 8), gate 64 being now closed against branch 51 and gate 62 opening to permit of the passage of the roller 107. The pins have their head ends introduced into the wire guards 87 and are engaged by the suction cups 82. When the elevator descends, the roller 107 is deflected laterally by the gate 62 and the roller passes through branch 48 and shifts gate 64 to the left so that the roller may again enter the vertical channel track 46. By virtue of this movement of the roller 107, the crank 106 with the rock shaft 99 are turned one-half revolution, and the elevator is inverted so that the suction cups 82 are lowermost when the elevator approaches the bed to spot the pins. When the elevator next moves upwardly to the intermediate position, the gate 64 having been shifted to the left, the roller 107 is deflected into the branch 51 and passes through this branch and through branch 53 and past gate 59 but stops beneath gate 62. The elevator is again reversed so that the resetting suction cups 93 are now in the lowermost position in which they may engage with the head ends of the standing pins when the elevator next descends to pick them up. The roller 107 upon this downward picking up movement of the elevator shifts the gate 64 to the right. When the elevator again rises to lift the standing pins so that sweeping may occur, roller 107 cannot enter branch 51 as the gate 64 is closed against branch 51 and the roller 107 will stop in the track 46 near and beneath the gate 62. The elevator then moves downwardly to reset the pins and after this action it moves to the uppermost position for another load of elevated pins and the elevator is not inverted since roller 107 continues to travel throughout in the grooved track 46, as is obvious.

In Figures 1a, 1b and 4a, a modification of the ball and pin return means is shown. In this case, the trunnions 155a of the pit elevator platform or tray 154a, in their normal position, are supported on open bearings 477, and the tray is suspended from a stationary frame 478 by four ropes or cables 479 running over drums 480 driven by a reversible motor 481 through speed reduction 482 and chains 483 and 484.

The elevator 154a is provided with stationary side walls 485 and with a hinged end wall 486 secured in upright position by a latch 487 which is held in engagement by a flat spring 488 attached to the under-side of the tray. The tray is weighted so that normally it rests on the forward stop 157, but when a thrown ball rolls on the same it is tilted so as to rest on a rearward stop 489. In this position the switch 396 on the bottom of pit 42 is closed, thereby starting the motors 359 and 384 (Figure 26) causing the elevator 65 to descend.

In the down position of the elevator 65, while the suction cups 93 of the same engage with the heads of the standing pins, the cam 434, driven by motor 384, reverses the switch 380 and the elevator ascends with the pins. On its upward stroke the roller 317 carried by it, in engaging cam lever 296 (Figure 22) admits suction through hose 290 to cylinder 287 thereby actuating the sweep 338, as described heretofore.

At the end of the forward stroke of sweep 338, a switch 490 (Figures 1a and 1b) actuated directly or indirectly by the same, starts the motor 481 thereby raising elevator 154 with the thrown ball and fallen pins. While sweep 338 returns, the tray 154 reaches the end of its up-stroke, discharging its load and reversing motor 481. Thereupon the empty tray descends to its starting position in pit 42.

In the meantime the cam 434 driven by motor 384 has reversed motor 395 so that now the elevator 65 descends, resetting the lifted pins. Meanwhile, the cylinders 336 with sweep 338 return to their normal up-position and, the cam 434 having once more reversed the motor 359, the elevator 65 also ascends to its normal position.

Upon throwing of the second ball, the elevator starts to ascend to its uppermost position on its way first operating the sweep 338, which in turn actuates the tray 154, thereby delivering the remainder of the pins to the conveyor 170 and then tilting the rails 204 to 213, thus transferring the accumulated pins into the positions marked No. 1 to No. 10 in Figure 2, in which they enter the guards 87 and finally engage the suction cups 82 as the elevator arrives in top position, ready for respotting the same on the subsequent descent and reversing of the elevator.

In case of a strike the elevator, by virtue of the extension rod 450, ascends to its top position directly after its descent upon throwing of the first ball and immediately returns with the collected pins for respotting, as before.

On its up-move, the tray 154a is guided by slotted rails 491 in which slide the trunnions 155a, and as it reaches its top position 154', its latch spring 488 engages a stop 492 attached to one of the guide rails 491, thereby releasing the latch 487 and allowing the end wall 483 to swing down, so that the ball and pins carried by the tray will roll off on to the transverse portion 44a of the ball return raceway 44.•

As the spring 488 engages the stop 492, a reversing switch, similar to 279 in Figure 25, is actuated thereby reversing the motor 481 and causing the tray to descend to its starting position, the overrun of the motor after actuating the reversing switch allowing sufficient time for the discharge of the tray. On the downward travel of the tray, its collapsed end wall 486 engages a cam surface 44b on the transverse runway 44a whereby the same is raised to its original position in which the spring 488 causes the latch 487 to snap into place, so that the end wall is up when the tray reaches its starting position in the pit.

The transverse runway 44a is made in the form of a chute with an opening wide enough for the pins which are discharged downwardly back of the bumper 158, but not the balls, to pass therethrough. The bottom 493 of the chute is inclined towards the conveyor 170 and has an end wall 494 against which the discharge pins come to rest. Both the chute bottom and its end wall are slotted at spaced distances to allow the passage of rows of bent fingers 495 carried at spaced intervals by the conveyor chains 170, each of these rows of fingers being backed by a wall 496.

The motor 350 being started and the chains 170 set into motion by switching the apparatus into operation, the fingers 494 pick up the bowling pins on the outlet 493 of chute 44a and carry them to the top of a pair of vertical guide rails 497 between which slide the cross-bars 498 on the chains 170 to which the fingers 495 are attached, thereby holding the said fingers in horizontal position. As each cross-bar 498 leaves the guide rails 497, the weight of the bowling pins carried by its fingers, tips the latter and causes the pins to roll onto an endless belt 499 driven by a chain 500 from a shaft 501 rotated by bevel gears 502 from upper conveyor shaft 177.

A guard 503 guides the pins to a chute 504 at the run-off pulley of belt 499, this chute delivering the pins to a pair of spaced horizontal spiral rods or worm screws 505a and 505b, one of which is driven by a chain 506 on sprockets 507 and 508 from a countershaft 177a connected by gears 177b to shaft 177, and drives the other by a chain on sprockets 509. The spacing between these spirals is somewhat less than the belly diameter of the bowling pins so that, on landing upon them, the pins will hang heads down between the spirals. The rotation of the latter drives them in the direction of the arrow until they drop into a chute 510 which delivers them to a second pair of spirals 511a and 511b pointing in the opposite direction, one of which has a sprocket 512 driven by a chain 513 from a sprocket 514 on countershaft 177a, and in turn drives the other by a chain on sprocket 515. On the spirals 511, the ten pins accumulate against a stop 516 ready to be picked up by the suction cups 217 of the carriages 214 on the several transfer rails 204 to 213 on which they are taken to the spotting guards 87 of the elevator 65 at the proper moment.

The direction of rotation of the worms and the direction of advance of the threads has been found of great importance in rendering this worm shaft advancing means practical. It has been discovered that to work satisfactorily, both worms should rotate in the same annular direction, i. e., if one rotates in a clock-wise direction as shown in Figure 1a, the other must also rotate in a clock-wise direction, such that one pin contacting worm surface is moving upwardly and the other is moving downwardly.

While not wishing to confine myself to any particular theory, my experience has been that if both rotate with their pin contacting faces moving downwardly, the pin wedges and jams, while on the other hand, if they rotate in an upwardly direction as to the pin contacting surface, the pin crawls upwardly and out of the worms.

With this rotation of the worm, it has further been found important to satisfactory operation that both worms be of the same hand, that this, if one is a left-hand worm, the other should be a left-hand worm, such that the rotation causes the thread of both worms to advance in the direction of desired movement of the pin.

As shown in Figure 4a, which shows the worms of Figure 1a as seen from the right, the worm 505a has its pin contacting face move downwardly, and the worm is of a right-hand type, as viewed in Figure 1a, which tends to move the pins to the left in the direction of the arrow shown in Figure 4a. Worm 505b is also a right-hand worm, the upwardly moving pin contacting surface of which also tends to advance the pins to the right as shown in Figure 4a, and also to lift the pins a little, preventing jamming. Worms 511a and 511b rotate in the same direction as the worms 505a and 505b, but are left-hand worms (as shown) and their tendency is to move the pins in the direction shown by the arrow in Figure 4a, that is, to the right since the worms have an advancing movement towards the right. The direction in which the worms move the pins will be understood by comparison with an ordinary right-hand threaded bolt and nut. If the bolt is in horizontal position with the head to the left, and the head is held against longitudinal motion and the bolt is rotated in a right-hand direction (clock-wise as viewed from the head end of the bolt), the nut will move toward the head of the bolt, that is, to the left. Thus the pins in the right-hand screws 505a and 505b will move to the left in the same manner.

As described the spirals or screws carry the pins to the left (Figure 4a), and in so doing the head ends of the pins enter a U-shaped trough 520 which guides the pins in an upright position, and in being advanced the pins will ride along the vertical wall 520b to the right of the pins (when the screws rotate in a clockwise direction) and this contact aids the screws materially in forwarding the pins, locates them better, and prevents the pins from swaying from side to side. The forward end of the trough 520 is provided with a curved portion 521 (Figure 4a) permitting easy entry of the pins between spirals 505a and 505b. Upon reaching the ends of the spirals the pins are discharged to a plate 510 which directs them to a second pair of spiral rods or screws 511a and 511b which are connected together by a chain 515 and one of which is driven by a chain 513 and sprocket 512 and 514 from the shaft 177a. The rods or screws 511a and 511b carry the pins toward the right (Figure 4a) and the pins are also guided in a U-shaped trough 522 in the same manner as heretofore described, the first pin engaging a stop 516 and the remaining pins being assembled in a row in side-by-side relation, this second pair of spiral rods or screws constituting a magazine adapted to support ten bowling pins in position to be removed by the suction cups 217 of the transfer mechanism for delivery to the guards and suction devices of the carrier 65. The base of the troughs 520 and 522 serve as a stop for the head ends of the pins which have a tendency to move up and down in being advanced by the screws. The base of trough 522 also serves as a positive stop for the pins at the time they are engaged by the transfer mechanism thus overcoming the possibilities of spreading the spirals. A modified form of pin head engaging and positioning member is shown in Figure 1c wherein an L-shaped trough 523 can be used to accomplish the same duties as the U-shaped trough. In this type of trough, with the screws turning in a clockwise direction the heads of the pins will engage the vertical wall of the trough, but, if the screws were to be driven to turn in the opposite direction the trough must be reversed so that the vertical wall is to the left of the pin. Obviously other suitable devices may be devised.

The switch 490 which momentarily closes a relay (similar to 400 in Figure 26) controlling the motor 481 operating the ball and pin return tray 154, is located below one of the gutters of alley 40 (Figure 1b) and is actuated by a blade 517 attached to sweep 338 and projecting into a narrow groove 518 provided for its travel in the rear end of the gutter.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. In apparatus for setting pins upon a bed, an elevator arranged above the bed, driving means to raise and lower the elevator, pin engaging suction means carried by the elevator, mechanism automatically actuated when the first ball is rolled to cause the driving means to lower the elevator to a position in proximity to the pins so that the suction means engages the pins and then raise the elevator and again lower the elevator to reset the pins and again raise the elevator to a given elevation and stop the same, means automatically set into operation when the elevator is holding the pins spaced from the bed to sweep the bed, means to supply pins to the suction means when the elevator approaches the given elevation, said mechanism also being actuated by the rolling of the second ball to cause the driving means to lower the elevator to set the pins and then cause the elevator to rise and stop at an elevation above the bed, and means to automatically actuate the sweeping means when the elevator starts upon its downward movement to set the pins.

2. In apparatus for setting pins upon a bed, an elevator arranged above the bed, driving means to raise and lower the elevator, pin engaging suction means carried by the elevator, mechanism automatically actuated when the first ball is rolled to cause the driving means to lower the elevator so that the suction means engages the pins and then raise the elevator to hold the pins spaced from the bed and again lower the elevator to reset the pins and again raise the elevator to a given elevation and stop the same, means to sweep the bed, means automatically thrown into action when the elevator is holding the pins spaced from the bed to actuate the sweeping means, means to gather up the pins passing from the bed and elevate the same and feed them to the suction means of the elevator when the elevator approaches the given elevation, said mechanism also being actuated by the rolling of the second ball to cause the driving means to lower the elevator and set the pins and then raise the elevator and stop the same at an elevation above the bed, and means thrown into action when the elevator descends to set the pins to actuate the sweeping means.

3. In apparatus for setting pins upon a bed, an elevator arranged above the bed, driving means to raise and lower the elevator, pin setting suction means arranged upon one side of the elevator and carried thereby, pin spotting suction means arranged upon the opposite side of the elevator and carried thereby, mechanism automatically actuated when the first ball is rolled to cause the driving means to lower the elevator from an intermediate position so that the spotting suction means engages the pins and then raise the elevator to hold the pins spaced from the bed and again lower the elevator to reset the pins and again raise the elevator to a loading position above the intermediate position and stop the same, means to sweep the bed, means automatically actuated when the elevator is holding the pins spaced from the bed to actuate the sweeping means, means to gather up the pins passing from the bed and elevate the same and feed them to the suction setting means when the elevator rises to the loading position above the intermediate position, said mechanism also being actuated by the rolling of the second ball to cause the driving means to lower the elevator from the loading position to set the pins and then raise the elevator and stop the same at the intermediate position, means thrown into action when the elevator descends from the loading position to set the pins to actuate the sweeping means, means to invert the elevator as its descends from the loading position to the pin setting position and to again invert the elevator as it moves upwardly from the lowered pin setting position to the intermediate stopped position.

4. In apparatus for setting pins upon a bed, an elevator arranged above the bed, driving means to raise and lower the elevator, pin receiving means arranged above the bed, means to gather up the pins passing from the bed and convey the same to the pin receiving means, pin transfer means, suction pin setting means carried by the elevator, means to actuate the transfer means when the elevator approaches the same to cause the transfer means to transfer the pins from the holding means to the pin suction setting means, means to actuate the driving means to cause the elevator to travel upwardly toward the pin transfer means and then downwardly toward the bed, and means to invert the elevator as it travels downwardly.

5. In apparatus for setting pins upon a bed, an elevator to be raised and lowered, suction pin engaging means carried by the elevator, pin supporting means disposed at an elevation above the bed, conveying means receiving the pins passing from the bed and supplying the same to the pin supporting means, a tiltable support arranged near the pin supporting means, means movable longitudinally of the tiltable support and including devices to engage with the pins held by the pin supporting means, the longitudinally movable means serving to transfer the pins from the pin supporting means to the suction pin engaging means of the elevator, and means to tilt the tiltable support.

6. In apparatus for setting pins upon a bed, an elevator to be raised and lowered, pin engaging means carried by the elevator, pin supporting means disposed at an elevation above the bed, conveying means receiving the pins passing from the bed and supplying the same to the pin supporting means, carriage means to move between the pin supporting means and the pin engaging means of the elevator and including pin engaging means, and means to cause the carriage means to travel from the pin supporting means to the pin engaging means of the elevator when the elevator is moved to a raised position near the pin supporting means.

7. In apparatus for setting pins upon a bed, an elevator to be raised and lowered, pin engaging means carried by the elevator, pin supporting means disposed at an elevation above the bed, conveying means receiving the pins passing from the bed and supplying the same to the pin supporting means, a tiltable support arranged near the pin supporting means and including tracks, carriages to travel longitudinally of the tracks and having pin engaging means, the discharge ends of the tracks being arranged over the pin engaging means of the elevator, and means operated by the elevator to tilt the support.

8. In apparatus for setting pins upon a bed, an elevator to be raised and lowered, pin engaging means carried by the elevator, pin holding means disposed at an elevation above the bed, movable generally horizontally extending support means arranged near the pin holding means, conveying means mounted to travel along said support means having pin carrying means, and means relatively to move the support and the holding means to bring a pin held by said holding means into the range of action of said pin carrying means.

9. In apparatus for setting pins upon a bed, an elevator to be raised and lowered, pin engaging means carried by the elevator and arranged upon the side of the elevator which is uppermost when the elevator is in the raised position, pin supporting means disposed at an elevation above the bed and serving to hold the pins with their butt ends up, means to engage the pins and transfer them to the elevator with their head ends down for engagement with the pin engaging means of the elevator, means to raise and lower the elevator, and means to invert the elevator as it is being lowered.

10. In apparatus for setting pins upon a bed, an elevator to be raised and lowered, suction pin engaging means mounted upon the side of the elevator which is uppermost when the elevator is in the raised position, pin supporting means arranged at an elevation above the bed and serving to support the pins with their butt ends up, transfer means arranged to operate above the suction pin engaging means of the elevator and having suction means to engage the butt ends of the pins, means to raise and lower the elevator, and means to invert the elevator when it descends.

11. In apparatus for setting pins upon a bed, an elevator to be raised and lowered, suction means mounted upon the side of the elevator which is uppermost when the elevator is in the raised position, the suction means being adapted to engage the head ends of the pins, supporting means associated with the suction means and adapted to receive the head ends of the pins, pin supporting means arranged at an elevation above the bed and separate from the elevator and serving to support the pins with their butt ends up, transfer means having suction means to engage with the butt ends of the pins, means to actuate the transfer means so that the same conveys the pins from the pin supporting means to the suction means of the elevator, means to raise and lower the elevator, and means to invert the elevator when it descends.

12. In apparatus for setting pins upon a bed, an elevator to be raised and lowered, pin holders arranged upon the side of the elevator which is uppermost when the elevator is in the raised position, pin supporting means arranged at an elevation above the bed and serving to support the pins, carriages, pin gripping elements secured to the carriages and adapted to engage and grip the butt ends of the pins, means to cause the carriages to travel from the pin supporting means to the elevator, means to raise and lower the elevator, and means to invert the elevator as it descends.

13. In apparatus for setting pins upon a bed, an elevator to be raised and lowered, pin receiving means carried by the elevator, rails mounted for movement above said elevator, carriages mounted upon the rails to travel longitudinally thereof, pin engaging elements secured to the carriages, means for supporting the pins near the end of the rails, and means for imparting movement to said rails to lower said elements into position to engage the pins on said support.

14. In apparatus for setting pins upon a bed, an elevator, pin engaging means carried by the elevator, sweeping means, means to throw the sweeping means into action including a depressible element, a trip element mounted upon the elevator to depress the depressible element upon the upward movement of the elevator and to break when the elevator moves downwardly, releasable means for holding the trip element in a retracted position so that it will not engage and depress the depressible element, and means to actuate the releasable means.

15. In apparatus for setting pins upon a bed, an elevator having pin engaging means, means to raise and lower the elevator, a support, means to raise and lower the support, generally horizontally movable pneumatic means carried by the support, and a sweeping element connected with the pneumatic means.

16. In apparatus for setting pins upon a bed, an elevator having pin engaging means, means to raise and lower the elevator, a support, pneumatic means to raise and lower the support, means to throw the pneumatic means into action when the elevator is raised, generally horizontally movable pneumatic means mounted on said support, a sweeping element secured to the generally horizontally movable pneumatic means, and means to throw the generally horizontally movable pneumatic means into action when the support descends.

17. Sweeping means for a bowling alley, comprising a support, means to raise and lower the support, generally horizontal pneumatic means carried by the support, a sweeping element attached to the pneumatic means, means to throw the pneumatic means into action including an element, and a trip element secured to the support to actuate the first-named element.

18. In apparatus for setting pins upon a bed, an elevated hopper, tracks arranged to receive pins from the hopper, a generally vertical endless conveyor including tiltable buckets to receive the pins from the bed, each bucket being tilted when it approaches the hopper, a carriage, a pin engaging means secured to the carriage, means to raise and lower the carriage, and means to carry the pins along the tracks for transfer to the pin engaging means.

19. In apparatus for setting pins upon a bed, an elevated hopper to receive the pins, a track for receiving the pins from the hopper, the opening of the track being greater than the diameter of the head end of the pin and smaller than the maximum diameter of the pin so that the track supports the pin with the butt end up, the pins travelling longitudinally of the track, and a conveyor to feed the pins into the hopper.

20. In apparatus for setting pins upon a bed, an elevated hopper, a track on a level higher than said bed arranged to receive the pins from the hopper, the opening of the track being greater than the diameter of the head end of the pin and less than the maximum diameter of the pin so that the track supports the pin with the butt end up, portions of the track being inclined to cause the pins to travel longitudinally of the track, and said track comprising a rotary element to engage with the pins and aid in such longitudinal travel.

21. In a pin setter for use with a bowling alley bed having a pit at the rear of the bed and a bumper at the rear of said pit, the combination with a setter operable to set pins in playing arrangement on said bed, of a magazine adapted to hold sufficient pins for playing requirements, means cooperating with said magazine and said setter for delivering said pins from the magazine to the setter, elements spaced apart a distance sufficient to let pins pass between them, while supporting a ball, means mounting said elements to the rear of the top of said bumper, an elevator positioned in the bottom of said pit to receive pins and balls from the rear end of the alley, means cooperating with said elevator after all fallen pins and balls have been received thereon to raise the same and deposit the pins and balls rearwardly therefrom substantially simultaneously on to said elements to separate the ball from the pins, and conveyor means located behind said bumper for receiving the pins passing between said elements and delivering them to said magazine, and a ball return for returning the ball supported on said elements to the forward end of the alley.

22. The invention as set forth in claim 21 wherein said elevator has mounted on it an element movable to and from a position to retain the pins and ball thereon.

23. In a pin setter for use with a bowling alley having a pit at the rear of the alley and a bumper at the rear of said pit, the combination with a setter to set pins in playing arrangement on said alley, of a magazine adapted to hold a sufficiency of pins for playing requirements, means cooperating with said magazine and said setter for delivering said pins from the magazine to the setter, elements spaced apart a distance sufficient to let pins fall between them, while supporting a ball, means mounting said elements to the rear of the top of said bumper, an elevator positioned in the bottom of said pit to receive pins and balls from the rear end of the alley, means cooperating with said elevator after fallen balls and pins have been received thereon to raise the same and deliver the pins and balls rearwardly over the top of said bumper on to said elements to separate the ball from the pins, and conveyor means located behind said bumper for receiving the pins falling between said elements and delivering them to said magazine, and a ball return for returning the ball supported on said elements to the forward end of the alley, said conveyor means including a chain having an upwardly moving run with pin elevating flights thereon.

24. In a pin setter for use with a bowling alley having an alley bed, a pit at the rear of the bed and a bumper at the rear of said pit, the combination with a setter frame movable to and from a position to set pins on said alley, of a magazine for receiving at least ten pins, means cooperating with said magazine and said setter for delivering ten pins from the magazine to the setter, elements spaced apart a distance sufficient to let pins fall between them, while supporting a ball, means mounting said elements to the rear of the top of said bumper, an elevator positioned in the bottom of said pit to receive pins and balls from the rear end of the alley, means acting on said elevator after said balls and pins have been received thereon to raise the same and dump the pins and balls therefrom rearwardly over said bumper on to said elements to separate the ball from the pins, and conveyor means behind said bumper for receiving the pins falling between said elements and delivering them to said magazine, and a ball return for returning the ball supported on said elements to the forward end of the alley, said conveying means including spaced generally horizontal, moving members, spaced apart a distance greater than the handle portion of the pin but less than the diameter of the belly of the pin to arrange and support pins supported therebetween in uniform inverted position whether delivered thereto handle end or butt end first, said members being constructed and arranged to forward the pins in a generally horizontal direction as a result of their movement for delivery to said magazine.

25. An elevator for bowling alley pits comprising in combination a platform, means for intermittently moving said platform from pin and ball receiving position at the bottom of the pit to a pin and ball delivering position spaced above the pit, of means for retaining the pins and ball on said platform during the upward movement of the same including an element mounted on the platform adjacent one edge thereof and movable from a retaining position above said edge to a discharging position.

26. The construction set forth in claim 25 including mechanism for moving said element to discharge position at the upper position of the elevator.

27. The construction set forth in claim 25 including devices hingedly connecting said element to said platform.

28. The invention as set forth in claim 25 wherein said platform is arranged with its upper surface inclined to the horizontal to discharge the pins and ball when said platform is in its upper position.

29. In a pin setter for use with a bowling alley having a pit at the rear of the alley, the combination with a setting frame provided with means to set pins in playing arrangement on said alley and having thereon a plurality of pin holders, of a magazine for receiving the number of pins required for playing, a plurality of relatively movable pin carriers, and mechanism for imparting separate movements to said carriers to cause the same to move from pin receiving positions overlying said magazine to pin delivering positions in predetermined formation over said setter, and means cooperating with said carriers to transfer the pins from the carriers to the holders.

30. The invention as set forth in claim 29 including mechanism coacting with said holding devices and said setting frame for releasing the pins from said devices and transferring them to the holders on the setting frame.

31. The invention as set forth in claim 29 in which said magazine comprises elements spaced apart a distance less than the greatest diameter of the pins to support the pins in inverted relation and in which said holding devices are arranged to hold the pins in inverted position and present the same to the setter in said position.

32. The invention as set forth in claim 29 wherein said transferring means includes rails for supporting the holding devices and carriages movable along said rails carrying said devices, the delivery ends of said rails being arranged in general triangular bowling pin playing formation, and instrumentalities cooperating with said rails and devices for moving the devices to and fro along said rails.

33. The invention set forth in claim 29 including means for elevating pins from the pit of said bowling alley and delivering them into said magazine.

34. The invention as set forth in claim 29 wherein said transferring means includes tracks along which said devices are movable, and instrumentalities cooperating to move said devices from the magazine to the setter frame carrying a pin and back from the setter frame to the magazine, empty.

35. In a pin setter for bowling alleys, the combination with a magazine for holding the number of pins required for playing, of a plurality of relatively movable pin holding devices, mechanism for imparting different movements to said devices to cause the same to deliver pins from the magazine into predetermined formation over the alley bed, said mechanism including rails along which said devices are movable.

36. The combination with a bowling pin setter frame having a group of pin holders mounted thereon, means moving said frame to and from a bowling alley bed to set pins thereon, of a pin magazine transferring means including differentially movable individual pin carriers for delivering pins from said magazine into positions overlying said holders, and means imparting relative vertical movement to said carriers and said setter frame to bring the pins into positions to be acted upon by said holders.

37. In a pin setter for use with bowling alleys, the combination with a magazine for receiving pins, said magazine having a plurality of elongated elements spaced apart a distance less than the greatest diameter of the pins, to provide a plurality of pin receiving sections each capable of receiving a row of pins, means for transferring pins from one section to the other section, mechanism coacting with the pit of the bowling alley for delivering pins therefrom into the magazine to hang therein with their handle ends down into one section constituting a receiving section, and pin setting means for removing pins from the other section of the magazine constituting a delivery section, capable of holding a number of pins sufficient for playing requirements and setting them on the alley bed in playing formation.

38. In a pin setter for bowling alleys, a magazine for holding the pins, said magazine having a plurality of sections each adapted to receive a row of pins each of said sections including a pair of generally horizontal, elongated elements spaced apart to receive and position the pins between them, mechanism for transferring the pins from one of said sections to the other, and means cooperating with said elements to impart movement to said pins lengthwise of said sections, a pin setter having pin holders, and transfer means for transferring pins from said magazine to said setter.

39. The invention as set forth in claim 38 wherein said mechanism consists of a means providing inner and outer shaped guide surfaces providing a curved path for the pins connecting one section with the other.

40. The invention as set forth in claim 38 wherein one of said sections is placed below the other and means are provided for releasing pins at one end of the upper section and delivering them downwardly into the lower section.

41. The invention as set forth in claim 38 including means for elevating the pins from the pit and delivering them into one of said sections, said transfer means operating to transfer the pins from another of said sections for delivery to the setter.

42. The invention as set forth in claim 38 including means for elevating the pins from the pit and delivering them into one of said sections, and a stop at one end of another section against which the longitudinally traveling pins accumulate in a solid row in predetermined position, said transfer means operating to transfer the pins from said row.

43. In a pin setter for use with a bowling alley having a pit at the rear of the alley, the combination with a magazine of generally sinuous formation having a portion for receiving a row of pins and having another portion spaced therefrom for delivering a row of pins, said magazine comprising elements spaced a distance apart less than the greatest diameter of the pins to support pins transferred to the magazine with the handle end of the pins down, of means cooperating with the pit to elevate the pins therefrom and deliver them into said magazine, said means including a liftable pit bottom and a ball separator comprising rails spaced apart a distance less than the diameter of the ball but greater than the diameter of the pins, the pit bottom in elevated position being constructed and arranged to deliver pins and balls onto said rails to separate the balls from the pins.

44. A magazine for pin setters comprising in combination spaced straight pin receiving portions each consisting of longitudinally extending elements spaced apart a distance less than the greatest diameter of the pins to receive the pins and support them in inverted position, one of said straight portions being arranged to receive the pins and the second of said portions being arranged to hold a supply of ten pins, a stop at the exit end of the latter portion, and means cooperating with said magazine to forward any pins in the receiving portion along said elements and against said stop to cause the accumulation of ten or more pins in contacting relation in said delivery portion, and connecting means for transferring pins from the receiving portion of the magazine to the delivery portion of the magazine.

45. In a pin setter for use with a bowling alley, the combination with a setter frame movable to and from a position to set pins in playing arrangement on said alley and having thereon ten pin holders, of a magazine for receiving a plurality of pins, a plurality of relatively movable pin holding devices, each adapted to hold a single pin suspended by one end of the pin, and mechanism for moving each of said devices from a pin receiving position adjacent said magazine to a pin delivering position adjacent said setter.

46. The invention according to claim 45 in which said mechanism is arranged to deliver the pins in triangular playing formation and includes a separate rail for each of said devices and a carriage supporting each device and traveling along the rail and in which said mechanism operates to move certain of the devices different distances along said rails to aid in bringing the pins into triangular playing formation.

47. In a pin setter for use with a bowling alley, the combination with a magazine for receiving ten or more pins, of a plurality of movable pin holding devices adapted to suspend the pin by its upper end only, pin setter mechanism for setting pins in predetermined formation on the alley bed, means for relatively moving said holding devices with respect to the pins in the magazine to bring the holding devices into operative engagement with the pins, mechanism for giving said holding devices generally horizontal movement to bring them into proximity to the setter mechanism, and means relatively moving said holding devices and said setter frame to bring the pins into the range of action of the setter mechanism.

48. In a pin setter for use with a bowling alley, the combination with a setter frame movable from a pin receiving position to a position to set pins in playing arrangement on the alley bed, said setter having thereon ten pin holders, a magazine for holding a plurality of pins, pin transferring devices for gripping the pins and transferring them from said magazine into the holders on said setter frame, and means for releasing the grip of said devices on said pins and thereafter rendering operative said holding devices to retain the pins on said setter frame.

49. In a pin setter for use with a bowling alley, the combination with a setter frame having thereon a plurality of pin receiving receptacles, of a magazine for holding a plurality of the pins, and pin transfer means for withdrawing pins from said magazine and transporting them while suspended from one end to a position within said receptacles.

50. The invention as set forth in claim 49 in which said transfer means operates to suspend the pins in inverted position by the butt ends.

51. In a pin setter for use with a bowling alley, the combination with a magazine for holding a supply of pins, of a series of rails, individual pin carriages movable along said rails, and means moving each of said carriages along said rails to a position supporting the pins over the alley bed, and mechanism cooperating with said magazine and transfer means to transfer pins from said magazine to said carriages.

52. In a pin setter for use with a bowling alley, the combination with a pin setter frame movable to and from a position to set pins in playing arrangement on said alley, of a magazine for holding a plurality of pins, transfer means for transferring pins from said magazine to said setter frame including devices for engaging and holding a pin in suspended relation by one end only during delivery of the pins to said setter frame, holding elements on said setter frame for receiving and holding the pins and flaring guide elements registering with said holding elements to guide the pin delivered by said devices into registered relation to said holding element.

53. The invention as set forth in claim 52 in which said setter frame is vertically movable and is arranged to support the holding devices in upwardly facing direction and during part of its upward movement to cause said guides to telescope onto the lower end of pins suspended by said transfer means.

54. The invention as set forth in claim 52, said guiding element having a portion closely embracing the belly of the pin preventing any swinging of the pin relative to the setter frame during movement of said frame.

55. In a pin setter for bowling alleys, the combination with a pin setter mechanism provided with devices for receiving pins in inverted position and setting them on the rear end of the alley in upright position for playing, of a magazine for supporting a sufficiency of pins for playing requirements in inverted relation, and means for transferring the pins from said magazine to said devices while still in inverted position.

56. In a pin setter for bowling alleys, the combination with a pin setter having means for receiving pins in inverted position and setting them on the rear end of the alley in upright position for playing, of a magazine for supporting ten or more pins in inverted relation, mechanism engaging the pins by the butts for transferring the pins from said magazine to said means while still in inverted position.

57. The invention as set forth in claim 55 in which said transferring means are provided with suction cups for gripping the pins by the butts.

58. In a pin setter for bowling alleys, the combination with a pin setter having means for receiving pins in inverted position and setting them on the rear end of the alley in upright position for playing, of a magazine for supporting a sufficiency of pins for playing requirements in inverted relation, and mechanism for transferring the pins from said magazine to said means while still in inverted position, said setter including devices for securing the pins by the handle end to said setter, and guide means for directing the handle end of the inverted pins delivered by transfer means into engagement with said devices.

59. A magazine for pin setters comprising in combination a pin magazine including spaced moving pin forwarding elements spaced apart a distance less than the greatest diameter of the pins to support and forward the pins in inverted relation, and means for delivering pins from said magazine including a pin gripping device arranged to engage and grip the pin by its butt end and lift the same out of said magazine.

60. In a pin setter for use with a bowling alley bed having a pit at the rear of the bed and a bumper at the rear of the pit, the combination with a setter for setting pins in playing arrangement on the alley bed, of a pin receiving chamber located back of said bumper, mechanism for gathering the pins and moving them from the pit upwardly in front of the bumper and discharging them backwardly over the bumper into said chamber, a pin magazine, means for transferring pins from said magazine to said setter, and pin conveying means located to the rear of the plane of said bumper cooperating with said mechanism to receive the pins discharged from said mechanism behind the plane of said bumper and deliver them from said chamber into said magazine.

61. The invention as set forth in claim 60 in which said pin conveying means extends behind and below the top of said bumper.

62. The invention as set forth in claim 60 in which said pin conveying means includes an upwardly movable flexible conveyor element having pin holding flights extending behind and below the top of said bumper, said mechanism being constructed and arranged to deliver pins downwardly behind and below the top of said bumper into said chamber to be acted on by said flights.

63. In a pin setter for bowling alleys having a pit behind the alley bed and a bumper at the rear of the pit, a pin receiving chamber located back of said bumper, ball and pin elevating means operating to elevate the ball and pins from the pit for discharge of said pins backwardly over said bumper into said chamber and return of said ball while maintaining said ball and pins at all times either in front of or above the bumper, means closely adjacent and to the rear of the top of said bumper for separating said pins from said ball upon discharge from said ball and pin elevating means, including means for guiding said pins rearwardly of said bumper down into said chamber, and pin elevating means utilizing the space behind the bumper and below the top thereof for conveying from said chamber pins received from said first-named elevating means during the elevating operations.

64. In a pin setter for use with a bowling alley bed having a pit at the rear of the bed and a bumper at the rear of the pit, the combination with means for setting pins in playing arrangement on the alley bed, of mechanism for elevating the ball and pins to a position above the level of the bumper, said mechanism operating to lift the ball and pins in front of and within the lateral limits of the bumper, and means closely adjacent said bumper, overlying and back of the plane of the front of said bumper for separating the pins from the ball and delivering said pins back of said bumper, a magazine, and devices located back of said bumper and below the upper level thereof arranged to receive pins discharged from said mechanism for delivering the separated pins to the magazine.

65. In a pin setter for a bowling alley having a pin supporting bed, the combination with a pin setter frame, of means for moving said frame from a pin receiving to a pin setting position, a magazine located above said bed for holding in side by side contacting upright row formation a sufficiency of pins for playing purposes, a plurality of pin transfer means mounted above said bed, and mechanism for moving each of said pin transfer means with pins held vertically therein to deliver said pins from said magazine to said setter.

66. In a pin setter for bowling alleys, the combination with a pin setter frame having pin holders thereon, of means for moving said frame from a pin receiving position to a pin setting position, a magazine for holding a sufficiency of pins for playing requirements with the pin in generally vertical position, and pin transfer means operating to lift said pins simultaneously and vertically from said magazine for delivery to said holders.

67. The mechanism claimed in claim 66 in which said transfer means includes pin embracing elements and devices for lowering said elements to embrace a part of the pins and thereafter lifting said elements to lift said pins.

68. In a pin setter for bowling alleys, the combination with means for setting pins on the alley bed having suction pin holders, transfer means having devices for supporting the pins, mechanism for relatively moving one of said means with respect to the other means to bring the pins supported by said devices into the range of action of said suction holders, and means for rendering said suction holders operative to hold the pins by suction and for releasing the pins from said devices.

69. In apparatus for setting pins upon the bed of a bowling alley having a pit, a track on a level higher than said bed arranged to receive pins, the opening of the track being greater than the diameter of the head end of the pin and less than the maximum diameter of the pin so that the track supports the pin with the butt end up, said track comprising opposed longitudinally extending elements at least one of which is a rotating spiral adapted to engage with the pins and as a result of its spiral configuration operate to push said pins along said track and collect them thereon to form a row of upright abutting pins, and pin conveying and elevating means for gathering pins from the pit of said bowling alley, elevating them and delivering them into said track.

70. In an apparatus for setting pins upon a bed, a magazine for holding a supply of pins, a support provided with a pin setter movable between the magazine and bed for receiving pins from said magazine to a position for setting them on said bed, pin transfer means for transferring pins from said magazine to a position for delivery to said setter, pin holders on said setter having receptacle portions for receiving a portion of a pin, and means for effecting the movement of said support between said bed and magazine to move the same upward towards said pins in said delivery position to cause said receptacles of said setter to surround the lower portions of said pins as a result of said upward movement.

71. In a pin setting device for bowling alleys, pin forwarding means comprising a pair of substantially parallel screws spaced apart a distance less than the greatest diameter of the pins to receive the pins between them and support the pins by the belly portion thereof, means to rotate each of said screws in the same angular direction, the threads of said screws being of the same hand such that the threads advance in the direction of the pins, and a stop located adjacent one end of said screws and against which the pins are forwarded by said screws in order to accumulate a contacting row of vertically arranged pins.

72. In an apparatus for setting pins upon a bed, a pin setting frame, means on said frame for receiving a plurality of pins in predetermined arrangement for location on said bed, a pin magazine, means for forwarding a plurality of pins to said magazine, mechanism for transferring pins from said magazine to said pin receiving means, said mechanism including a plurality of suction members, and means for creating suction in each of said members to grip the pins.

73. In an apparatus for setting pins upon an alley, a pin setting frame, means on said frame for receiving a plurality of pins in predetermined arrangement for location on said alley, a pin magazine, means for feeding pins to said magazine, mechanism for transferring pins from said magazine to pin receiving means of said setter frame, said mechanism comprising a plurality of fluid operated members, and means for directing fluid to said members to cause them to grip said pins.

74. In an apparatus for setting pins upon the bed of an alley, an elevator to be raised and lowered, pin engaging devices carried by said elevator constructed and arranged to support a set of bowling pins in playing arrangement, means for moving said elevator from pin receiving to pin setting position, and mechanism for holding pins in said devices, comprising fluid operated members, and means for directing fluid to said members to cause them to hold said pins in said devices during the movement of said pins from said receiving position until they are located in said arrangement upon said alley bed.

75. In a pin setting machine for bowling alleys, the combination with an alley adapted to support a plurality of pins in spotted position at one end thereof, said pins being free of any magnetic conducting materials, of means for sweeping said alley after each rolling of a ball down said alley, and mechanism including a plurality of independently operated pin holding devices, said mechanism being responsive to the throwing of the first ball of a frame for operating each of said devices independently to hold standing pins and for lifting said standing pins regardless of the number of pins remaining standing, and returning them to the same on or off spot position each occupied prior to its removal from said alley.

76. In a pin setting machine for bowling alleys, the combination with an alley having a bed for supporting thereon in playing arrangement pins free of any magnetic and conducting materials, of means for sweeping the alley after each rolling of a ball down the alley, mechanism responsive to the rolling of the first ball of a frame and the removal of a portion of the pins for lifting all standing pins from the alley regardless of the number of pins standing and causing the alley to be swept, said mechanism including a plurality of independently operated devices adapted to engage with the tapered extremities of the head ends of said standing pins, and means associated with each of said devices for operating each of said devices independently to grip said head ends of said pins for lifting from said alley and return them to the same spotted or off spotted positions occupied prior to being lifted.

77. In a pin setting machine for bowling alleys, a pin and ball separating device, a ball return mechanism for returning the balls to a player, means for sweeping the alley upon each rolling of a ball down the alley, a feeding mechanism, means for returning the pins to said feeding mechanism, a pin setter, mechanism responsive to the rolling of the first ball and the upsetting of a portion of the pins for causing pins left standing after the rolling of the ball to be lifted from the alley, said pins being free of any magnetic and conducting materials, means for sweeping the alley following the lifting of said pins, said mechanism including a plurality of independently operated means adapted to engage with the tapered extremities of the heads of standing pins and return them to their respective concentric or eccentric positions upon the alley, regardless of the number of pins to be lifted and returned to said alley, means responsive to the rolling of the second ball thereafter for causing the resetting of all of the pins irrespective of the pins removed by the second ball, and means responsive to the rolling of the first ball and the removal of all of the pins for effecting a resetting of all of the pins and the beginning of a new cycle.

78. In a pin setter for use with a bowling alley bed having a pit at the rear end of the bed, and a bumper at the rear of the pit, the combination with a setter for setting pins in playing arrangement on the alley bed, of a pin receiving chamber back of said bumper, mechanism for gathering all fallen or unwanted pins after the throwing of each ball and moving them in a single operation from the pit upwardly in front of the bumper and backwardly over the bumper into said chamber, a pin magazine, means for transferring pins from said magazine to said setter, and pin conveying means located behind said bumper cooperating with said mechanism to receive said pins as they are discharged from said mechanism behind the plane of said bumper into said chamber and deliver them to said magazine.

79. A bowling pin setting machine for use with a bowling alley comprising, mechanism for holding a plurality of pins in a vertical aligned series, a plurality of pin holding devices, a support, means for mounting said devices for individual movement on said support, means for aligning said devices on said support, means for positioning said aligned devices adjacent said aligned pins, means for effecting relative movement between said pins and devices for gripping the number of pins required for playing and removing them from said mechanism, and means for moving said devices out of alignment to locate the pins removed from said mechanism in substantial playing arrangement for transfer to said alley.

80. In a pin setting device for bowling alleys, pin forwarding means comprising a pair of substantially parallel screws spaced apart a distance less than the greatest diameter of the pins to receive the pins between them and support the pins by the belly portion thereof and assemble a plurality of vertically positioned pins thereon, means to rotate said screws to translate pins therealong to form said vertical assembly, and spaced members located directly beneath said screws and parallel thereto for engaging and guiding the head ends of pins moving along said screws.

81. In a pin setter, a magazine for holding the pins, said magazine having elongated pin feeding and storing elements spaced apart to feed and position a number of upright pins sufficient for playing in an aligned assembly, and means located beneath said elements arranged to engage with the sides of the handle portions of each of said pins moving along said elements, said means being constructed and arranged to maintain each of said pins in substantially vertical position during the movement of each pin along said elements.

82. A magazine for pin setters comprising in combination spaced substantially parallel moving pin forwarding elements spaced apart a distance less than the greatest diameter of the pins to support and translate the pins in inverted upright relation to form a row of aligned upright pins, and spaced parallel members located beneath said elements constructed and arranged to be engaged by the head ends of pins traveling along said members for assisting in the movement of pins along said elements and alignment of pins in said row.

83. A magazine for pin setters comprising in combination spaced pin forwarding elements spaced apart a distance less than the greatest diameter of the pins to support and forward the pins in inverted relation, means for delivering pins from said magazine including a pin gripping device arranged to engage and grip the pin by its butt end and lift the same out of said magazine, and means coacting with the head end of each pin to position each pin for engagement by said device.

84. In a pin setter for bowling alleys, the combination with a pin setter frame, of means for moving said frame from a pin receiving to a pin setting position, a magazine for holding in side by side contacting upright row formation a sufficiency of pins for playing purposes, a spaced pin head guide member located beneath said magazine, pin transfer means for transferring said pins from said magazine to said frame, and mechanism engaging said pin heads to prevent axial movement of said pins in said magazine when said pins are engaged by said transfer means.

85. In a pin setting machine for bowling alleys, the combination with an alley arranged to support a plurality of pins in playing position at one end thereof, of a pin setter, mechanism including a plurality of independently operated pin holding devices for resetting upon the alley in the same on or off spot positions the same pins which were left standing after the throwing of a ball regardless of the number of pins remaining standing, mechanism for setting the full number of pins upon said alley, and means controlled by the downward movement of the setter for determining which of the first two mechanisms is to be operated, said last-named means including control operating means carried by the setter operative in response to the presence or absence of pins on said alley after the throwing of a ball.

86. In a pin setting machine for bowling alleys, the combination with an alley arranged to support a plurality of pins in playing position at one end thereof, of a pin setter, mechanism for resetting upon the alley the same pins which were left standing after the throwing of a ball, mechanism for setting the full number of pins upon said alley, a detector arm mounted on said setter for engagement with said alley, and means under the control of said arm upon downward movement of said setter and engagement of said arm with said alley after the throwing of the first ball and the removal of all pins for actuating said last-named mechanism.

87. In a bowling pin setting machine for use with a bowling alley having a pin supporting bed, a magazine mounted above said bed provided with means for supporting a row of substantially vertical non-conducting bowling pins in a number sufficient for playing purposes with their butt ends extending upward, and associated mechanism for removing said pins from said magazine and locating them in upright playing arrangement on said bed.

88. In a bowling pin setting machine for use with a bowling alley having a pin supporting bed, a magazine mounted above said bed including pin supporting members for positioning a plurality of non-conducting pins in a number sufficient for bowling purposes with their longitudinal axes vertical, mechanism located above said bed associated with said magazine for removing said pins from said magazine, said mechanism including means for translating said pins longitudinally relative to said alley and positioning said pins for delivery in playing arrangement on said alley, and means for maintaining said axes of said pins vertical during said transfer by said mechanism to said bed.

89. A magazine for pin setters comprising in combination spaced movable pin feeding elements spaced apart a distance less than the greatest diameter of the pins to support and forward pins in inverted relationship, spaced vertical members located beneath said elements and parallel thereto coacting with the heads of pins moving along said elements, and means for delivering pins from said magazine including a pin gripping device arranged to engage and grip the pin by its butt and lift the same out of said magazine.

90. A magazine for pin setters comprising in combination spaced movable pin feeding elements spaced apart a distance less than the greatest diameter of the pins to support and forward pins in inverted relationship, spaced vertical members located beneath said elements and parallel thereto coacting with the heads of pins moving along said elements, means for delivering pins from said magazine including a pin gripping device arranged to engage and grip the pin by its butt and lift the same out of said magazine, and means engaging the head ends of said pins and preventing axial downward movement thereof during the operation of said last-named means.

91. In a bowling pin setting machine for a bowling alley, the combination with a storage magazine for holding the number of pins required for playing, of a rigid frame, a plurality of spaced carriages movably mounted on said frame, pin grippers carried by each of said carriages, and means for lowering and raising said frame and said carriages to cause said grippers to procure pins from said magazine, and means for imparting differential movement to said carriages to deliver pins from said magazine into predetermined pin playing formation for delivery to the alley.

92. In a pin setter for bowling alleys, the combination with a magazine for holding the number of pins required for playing and a plurality of pin setter elements, of a frame mounted above said magazine, a plurality of relatively movable pin holding devices mounted upon said frame, mechanism for lowering and raising said frame to engage and lift pins from said magazine, means for translating said pins from said storage magazine to a point above said pin setter elements, and means for lowering said frame to locate said pins in said elements.

93. In a pin setter for bowling alleys, the combination with a pin magazine, of a pin transfer device for transferring a plurality of pins from said magazine to said setter, said device including a frame, a plurality of differentially movable individual pin carriers mounted on said frame, and means for lowering and raising said frame to remove pins from said magazine and transfer them to a point of delivery to said setter.

94. In a pin setter for bowling alleys, the combination with a magazine for holding pins, said magazine being arranged to store at least the number of pins required for playing, of pin transfer mechanism positioned above said storage, said mechanism comprising a frame, a plurality of pin gripping elements carried by said frame, means for lowering said frame to grip said pins, means for raising said frame to lift said pins from said magazine, means for imparting differential movements to said elements to cause the same to deliver pins into predetermined formation over the alley, said means including rails mounted upon said frame and movable therewith.

95. In a bowling pin setting machine for a bowling alley provided with a pin supporting bed and a pit adjacent said bed, a pin storage magazine, a movable frame, a plurality of spaced movable pin holders mounted on said frame, a pin setter, means for moving said frame relative to said magazine and setter for positioning pins in said holders, and means for effecting relative movement between said holders to move the same and pins held therein to substantially pin playing position for delivery to said setter.

96. In a bowling pin setting machine for use with a bowling alley having a pin supporting bed, mechanism for placing bowling pins in playing arrangement on said bed, comprising an elevator, pin handling devices mounted on said elevator, means for moving said elevator to and from said bed to set and reset pins thereon, means associated with each of said devices for determining the presence or absence of standing pins after the throwing of a ball on said bed, and selective means operative according to the number of pins felled by a ball for controlling the operation of said machine.

97. In a bowling pin setting machine, an alley bed, and mechanism for placing bowling pins on said bed in playing arrangement, said mechanism comprising an elevator, pin handling devices mounted on said elevator, means for moving said elevator to and from said bed, means associated with each of said devices for determining the presence or absence of standing pins after the throwing of a ball over said bed, and selective means operative according to the number of pins felled by a ball for controlling the operation of said machine.

98. In combination, a bowling pin setter for use in setting bowling pins on the bed of a bowling alley, said setter having a plurality of pin holders mounted thereon in positions corresponding to the playing positions on said bed, mechanism for moving said setter to and from said bowling alley bed to set pins thereon, and pin transferring means mounted above said bed including movable individual pin carriers for delivering pins into positions adjacent said holders, said mechanism including means for imparting relative vertical movement to said carriers and said setter to bring said pins into positions to be engaged by said holders.

99. In combination, a bowling pin setter for use in setting bowling pins on the bed of a bowling alley, said setter having a plurality of pin holders mounted thereon in positions corresponding to the playing positions on said bed, mechanism for moving said setter to and from said bowling alley bed to set pins thereon, and pin transferring means mounted above said bed including movable individual pin carriers for delivering pins into positions adjacent said holders, said mechanism including means for imparting relative vertical movement to said carriers and said setter to bring said pins into positions to be engaged by said holders, and selectively operated means responsive to the presence or absence of pins on said bed after the throwing of a ball for effecting the delivery of a new set of pins to said alley.

100. In apparatus for setting pins upon a bed, an elevator to be raised and lowered, pin engaging means carried by the elevator, pin holding means disposed at an elevation above the bed, generally horizontally extending support means arranged near the pin holding means, conveying means mounted to travel along said support means having pin carrying means, and means for effecting relative movement between said support and the holding means to bring a pin held by said holding means into the range of action of said pin engaging means.

101. In a pin setter for bowling alleys, the combination with a pin receiving station, of a plurality of relatively movable pin holding devices operative at said station to receive a set of bowling pins, and mechanism for imparting different movements to said devices to cause the same to move pins from said station into predetermined triangular formation over the alley bed, said transferring means including rails along which said devices are movable.

102. The combination with a bowling pin setter frame having a group of pin holders mounted thereon, and means for moving said frame to and from a bowling alley bed to set pins thereon, of a pin magazine, transferring means including differentially movable individual pin carriers for delivering pins from said magazine into positions adjacent said holders, and means imparting relative vertical movement to said carriers and said setter frame to bring the pins into positions to be acted upon by said holders.

103. In a pin setter for bowling alleys having a pin supporting bed, the combination with a pin setter frame, of means for moving said frame from a pin receiving to a pin setting position, a magazine mounted above said bed for holding in side by side upright row formation a sufficiency of pins for playing purposes, pin transfer means, and mechanism for simultaneously moving said transfer means longitudinally relative to said bed for transferring said sufficiency of pins from said magazine to said setter frame.

104. In a pin setting machine for bowling alleys, the combination with an alley provided with means for supporting a plurality of pins in playing arrangement, said pins being free of magnetic and conducting materials, of mechanism for resetting upon said alley the same pins which were left standing after the throwing of a ball regardless of the number of pins remaining standing after said ball has been thrown, said mechanism including a plurality of suction holding members for lifting and resetting all standing pins, mechanism for setting the full number of pins upon said alley, and automatically operative selecting mechanism for determining which of the first two mechanisms is to be operated.

105. In a pin setting machine for bowling alleys, the combination with an alley arranged to support a plurality of pins free of any magnetic and conducting materials in playing position at one end thereof, of a pin setter, mechanism for resetting upon said alley the same pins which were left standing after the throwing of a ball, said mechanism comprising a plurality of suction operated holding members constructed and arranged to reset a full set or less than a full set of pins, mechanism for setting the full number of pins upon said alley, and means controlled by the downward movement of said setter for determining which of the first two mechanisms is to be operated.

106. In a pin setting machine for bowling alleys, the combination with an alley adapted to support a plurality of pins free of any magnetic and conducting materials arranged in playing position adjacent one end thereof, of a pin setting table provided with a plurality of pin spotting elements, mechanism for resetting upon said alley pins which were left standing after the throwing of a ball regardless of the number of pins remaining standing, said mechanism including a plurality of suction holding members for lifting and resetting all standing pins, mechanism for setting the full number of pins upon said alley, and means on said table responsive to the presence or absence of pins on said alley for selecting which of the first two mechanisms is to be operated.

GOTTFRIED J. SCHMIDT.